US007640506B2

(12) United States Patent
Pratley et al.

(10) Patent No.: US 7,640,506 B2
(45) Date of Patent: Dec. 29, 2009

(54) METHOD AND APPARATUS FOR VIEWING AND MANAGING COLLABORATION DATA FROM WITHIN THE CONTEXT OF A SHARED DOCUMENT

(75) Inventors: Christopher Pratley, Seattle, WA (US); Marcin Sawicki, Kirkland, WA (US); Anne Marie Renée Archambault, Redmond, WA (US); Raj Bharat Merchant, Kirkland, WA (US); Michael Anthony Rigler, Seattle, WA (US); Sean Blagsvedt, Seattle, WA (US); Ethan Joseph Bernstein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 790 days.

(21) Appl. No.: 10/607,780

(22) Filed: Jun. 27, 2003

(65) Prior Publication Data
US 2004/0267871 A1 Dec. 30, 2004

(51) Int. Cl.
*G06F 3/01* (2006.01)
(52) U.S. Cl. .................................................. 715/751
(58) Field of Classification Search .................. 715/751
See application file for complete search history.

(56) References Cited

U.S. PATENT DOCUMENTS

| 5,195,086 | A | * | 3/1993 | Baumgartner et al. ........ 370/264 |
| 5,649,105 | A |   | 7/1997 | Aldred et al. .......... 395/200.04 |
| 5,652,866 | A |   | 7/1997 | Aldred et al. ................ 395/500 |
| 5,675,520 | A |   | 10/1997 | Pitt, III et al. ................ 364/578 |
| 5,793,365 | A | * | 8/1998 | Tang et al. .................... 715/758 |
| 5,956,489 | A |   | 9/1999 | San Andres et al. ..... 395/200.51 |
| 6,119,147 | A |   | 9/2000 | Toomey et al. ............... 709/204 |
| 6,215,498 | B1 | * | 4/2001 | Filo et al. .................... 345/419 |
| 6,363,352 | B1 |   | 3/2002 | Dailey et al. .................... 705/9 |
| 6,396,512 | B1 |   | 5/2002 | Nickerson .................... 345/751 |
| 6,421,655 | B1 |   | 7/2002 | Horvitz et al. ................ 706/61 |
| 6,438,564 | B1 |   | 8/2002 | Morton et al. ............... 707/500 |
| 6,546,405 | B2 |   | 4/2003 | Gupta et al. ................. 707/512 |
| 6,608,636 | B1 | * | 8/2003 | Roseman ..................... 715/753 |
| 6,744,447 | B2 | * | 6/2004 | Estrada et al. .............. 715/751 |
| 7,076,546 | B1 | * | 7/2006 | Bates et al. .................. 709/224 |
| 7,185,054 | B1 | * | 2/2007 | Ludwig et al. .............. 709/204 |
| 7,213,051 | B2 | * | 5/2007 | Zhu et al. .................... 709/205 |
| 2002/0143885 | A1 |   | 10/2002 | Ross, Jr. ...................... 709/207 |
| 2003/0135558 | A1 | * | 7/2003 | Bellotti et al. .............. 709/206 |
| 2004/0174392 | A1 | * | 9/2004 | Bjoernsen et al. ........... 345/751 |

OTHER PUBLICATIONS

Screen Shots of Microsoft Outlook (1999, pp. 1-3).*
Maršić, Ivan, "Data-Centric Collaboration For Wired and Wireless Platforms," *Journal of Computing and Information Technology—CIT*, vol. 10, No. 3, Sep. 2002, p. 151-156.
Ewalt, David M., "A New Way of Collaborating Business/Business Processes," *Information Week*, No. 916, Nov. 25, 2002, p. 46-48.

(Continued)

*Primary Examiner*—Dennis-Doon Chow
*Assistant Examiner*—Le Nguyen
(74) *Attorney, Agent, or Firm*—Merchant & Gould

(57) ABSTRACT

Methods, systems, and apparatus are provided for viewing and managing collaboration data from within the context of a shared electronic document. A document editing pane is displayed for editing the shared document. In conjunction with the document editing pane, a collaboration pane is displayed for displaying the collaboration data. Through the collaboration pane, collaboration data such as the identities of one or more collaborators, task, documents, links and other information may be displayed. Actions may also be performed with respect to any aspect of the collaboration data through the collaboration pane.

17 Claims, 13 Drawing Sheets

OTHER PUBLICATIONS

Takehisa, K.; Itagaki, Y.; Nakahashi, O.; Okamura T., "Development of APEX Office Application," *NEC Research and Development*, vol. 43, No. 4, p. 295-299.

Curran, Kevin; "Peer-to-Peer Networking Collaboration Within Education," School of Computing and Mathematical Sciences, Univ. of Ulster, Magee Campus, Northern Ireland, BT47 3AL, UK, vol. 11, No. 1, p. 21-30.

Jern, M.; Palmberg, S.; Ranlöf, M., Visual Data Navigators—'Collaboratories,' Proceedings First International Symposium on 3D Data Processing Visualization and Transmission, Padova, Italy, Jun. 19-21, 2002, p. 66-69.

Zha, X.F.; Du, H., "Web-Based Collaborative Framework and Environment for Designing and Building Robotic Systems," Proceedings 2002 IEEE International Conference on Robotics and Automation, May 11-15, 2002, Washington, D.C., vol. 2, p. 2196-2201.

Anderson, Ron, "Far-Flung Firms Will Find ERoom's Workspace A Comfortable Place To Meet," *Networking Computing*, CMP Media Inc., vol. 12, No. 2, p. 34-36.

"Ketchum Portal Uses Plumtree, eRoom Technology to Collaborate With Staff, Clients," *I/S Analyzer Case Studies*, United Communications Group, vol. 40, No. 1, p. 1, 7-10.

Darrow, B., "Web Services Key To Groove 2.5," *CRN*, No. 1018, Oct. 28, 2002, p. 6.

"Lotus Notes (R5) Client Calendaring,", Nov. 2, 2001, XP-002302478, Retrieved from Internet: URL: http://web.archive.org/web/20011102175413/http://www/rhsmith.umd.edu/tr/LNR5Cal.htm> Retrieved on Oct. 22, 2004, p. 1-8.

"Screen Shots," Lotus Notes 6, Jun. 9, 2003, XP002302479, Screenshots of release, mail, calendar interface, p. 1-5.

Freed, Judy; "Using Microsoft Outlook A Beginners Guide E-Mail and Calendars," Sep. 19, 2002, University of North Carolina (At Charlotte), XP002302480, p. 1-190.

"Windows NetMeeting," Apr. 21, 2003, XP002302481, Retrieved from Internet: URL: http://web.arachive.org/web/20030421050139/http://publish.edu.uwo.ca/rick.kitto/resource_files/Housekeeping/Netmeeting.PDR> Retrieved on Apr. 21, 2003, p. 1-11.

Chinese Second Office Action dated Oct. 17, 2008 cited in Application No. 200410069436.2.

Chinese Third Office Action dated Apr. 10, 2009 cited in Application No. 200410069436.2.

Wen Xin, "Microsoft.Net Strategy-All-out MSN Approaches (Part I), MSN Explorer, A Beautiful Butterfly that Flies into the Window," 1994-2009 China Academic Journal Electronic Publishing House, www.pcschool.com.cn, pp. 49-52.

Wen Xin, "Microsoft.Net Strategy-All-out MSN Approaches (Part II), Smoke of Gunpowder Rises Again in MSN Messenger Instant Messaging Market," 1994-2009 China Academic Journal Electronic Publishing House, www.pcschool.com.cn, pp. 49-52.

\* cited by examiner

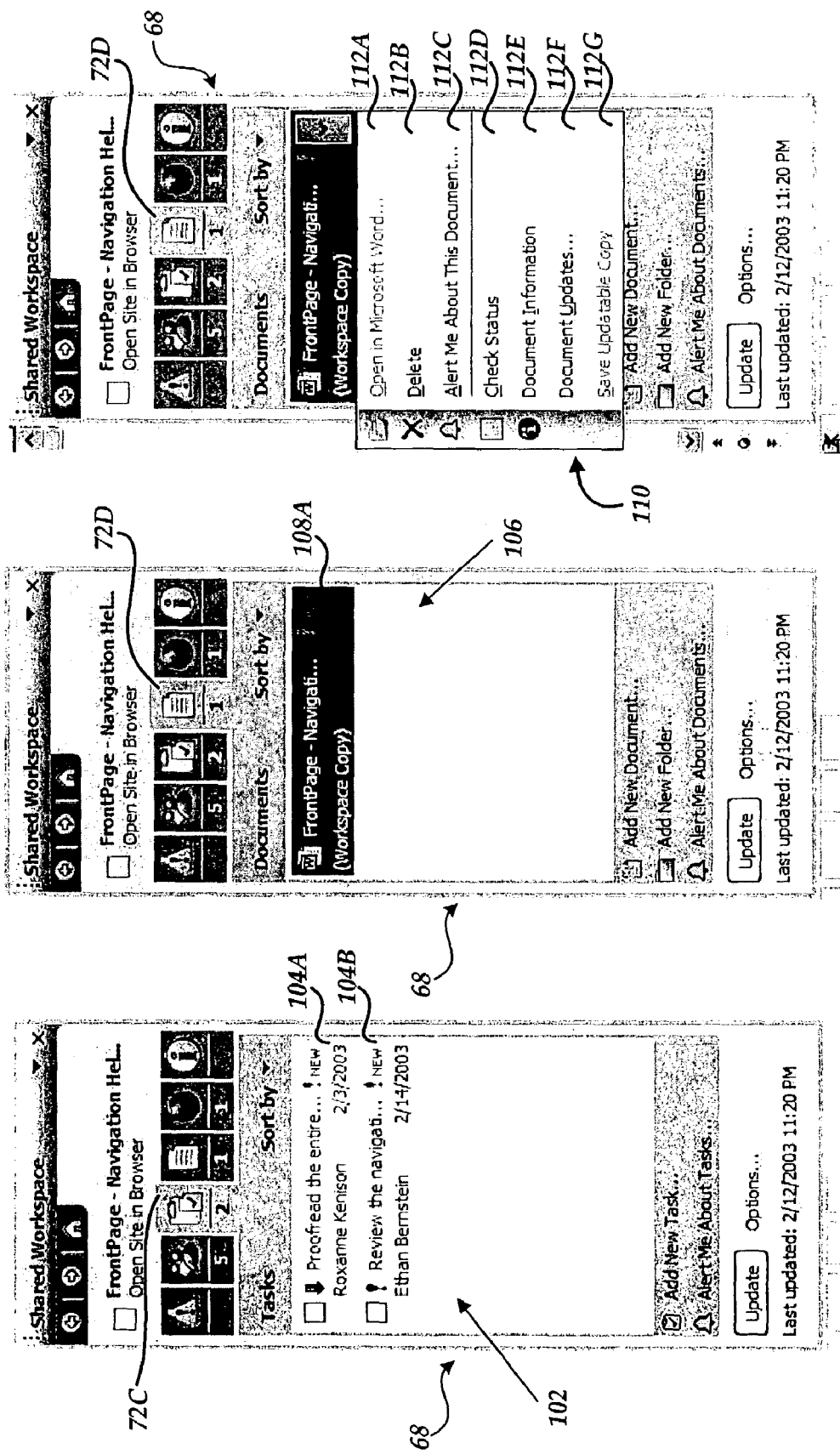

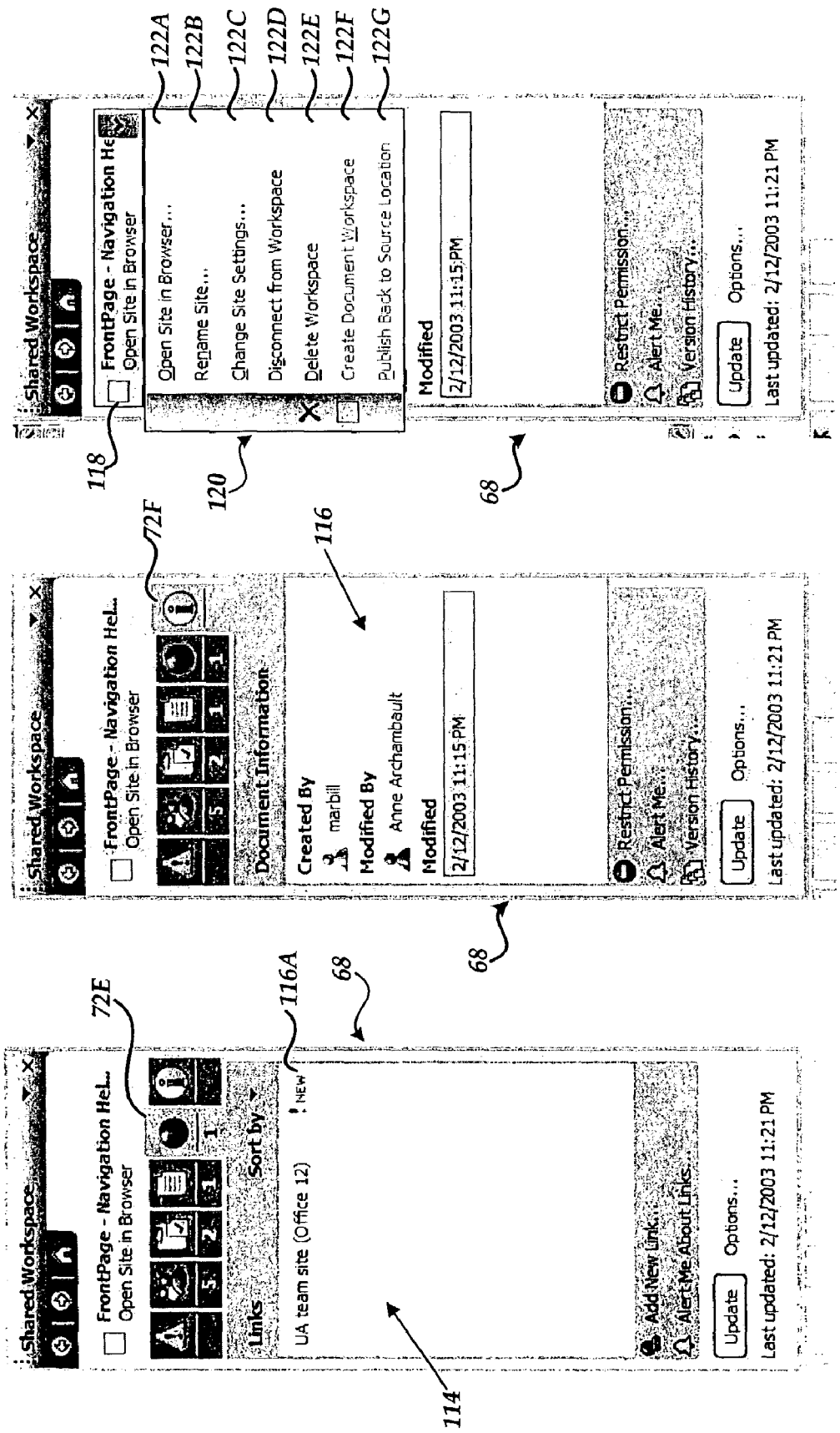

METHOD AND APPARATUS FOR VIEWING AND MANAGING COLLABORATION DATA FROM WITHIN THE CONTEXT OF A SHARED DOCUMENT

TECHNICAL FIELD

The invention generally relates to the field of computer user interfaces and, more specifically, to the field of user interfaces for viewing and managing collaboration data.

BACKGROUND OF THE INVENTION

It is very common in the workplace for groups of people to collaborate together on projects. In many cases, such projects involve the creation of electronic documents, such as word processing documents, spreadsheets, presentations, engineering diagrams, or other types of documents. Through collaboration, a better work product is typically produced than by individuals working alone.

In the past, collaboration during the creation of electronic documents was limited to printing a copy of a document and passing it around among the various collaborators for their comments. However, software tools have been developed that allow a much greater level of participation and interactivity by the collaborators. For instance, World Wide Web ("Web" or "WWW")-based tools have been created that allow users to collaborate together on projects, including the creation of electronic documents. Through such Web-based tools, users can share documents, communicate with one another, and perform other collaborative tasks. However, these Web-based tools suffer from several drawbacks.

One drawback to Web-based collaboration tools stems from the fact that it can be very time consuming to access the Web-based collaboration data. For instance, if a user is working on a project-related document in a word processing application program and desires to locate data regarding another document related to the project, the user must launch a Web browser application, navigate to the Web site provided for the project, and locate the data. Once the data has been located, the user then has to close the Web browser application program and return to the current document. This process can be time consuming and distracting for a user.

Another shortcoming of current Web-based collaboration tools stems from the fact that it is often difficult and time consuming to communicate with other project co-collaborators electronically. For instance, if one user is working on a project-related electronic document and wants to communicate with a co-collaborator, the user must first launch a Web browser application, navigate to the Web site provided for the project, and locate the contact information, such as an electronic mail ("e-mail") address or phone number, for the co-collaborator they wish to contact. Next, the user may switch to an instant messaging ("IM") application to determine if the co-collaborator is on-line and available to receive messages. If the co-collaborator is not on-line, the user must then switch to a personal information manager ("PIM") or e-mail client application to send the co-collaborator an e-mail message regarding the document. This process can also be time consuming and distracting for a user.

It is with respect to these considerations and other that the various embodiments of the present invention have been made.

SUMMARY OF THE INVENTION

In accordance with aspects of the present invention, the above and other problems are solved by a method and apparatus for viewing and managing collaboration data from within the context of a shared document. By providing collaboration data, such as the identifies of one or more collaborators, documents, tasks, and other types of information within the context of a shared document, the user may more easily and quickly access data relating to a collaborative project.

According to one aspect of the present invention, a method is provided for viewing and managing collaboration data from within the context of a shared electronic document. According to the method, a document editing pane is displayed that provides functionality for editing the shared document. Adjacent to the document editing pane, a collaboration pane is displayed that provides convenient access to collaboration data. Collaboration data may include the identities of one or more co-collaborators. In particular, a list identifying each of the co-collaborators may be displayed. For each co-collaborator identified in the list, a network status, such as the user's online or offline state may be displayed. According to the method, the selection of the displayed identity for one of the collaborators may be received. In response to receiving such a selection, one or more actions may be displayed that may be performed with respect to the selected collaborator. A request may then be received to perform one of the selected actions.

According to various aspects of the invention, the actions that may be performed with respect to a collaborator include scheduling an appointment on a calendar related to the selected collaborator, placing a telephone call to a number associated with the selected collaborator, sending an electronic mail message to an e-mail address associated with the selected collaborator, initiating an instant messaging session with the selected collaborator, editing information associated with the selected collaborator, removing the selected collaborator from a collaborative group, adding the selected collaborator to a contacts list, or viewing properties associated with the selected collaborator. Additional actions may also be performed.

According to another aspect of the invention, a method is provided for viewing and managing collaboration data that includes providing a first user interface pane for editing a shared electronic document. A second user interface pane is also provided that is displayed in conjunction with the first user interface pane. The second user interface pane is operative to provide functionality for viewing and managing the collaboration data. According to this aspect of the invention, the second user interface pane includes a first user interface object which, when selected, will cause a description of one or more tasks related to the collaborative project to be displayed. Any of the tasks may then be selected and, in response thereto, a list of actions that may be performed with respect to the selected task may be displayed. One of the displayed actions may then be selected and performed with respect to the selected task.

According to various aspects of the invention, the actions that may be performed with respect to a selected task include deleting the selected task, marking the selected task as completed, creating a new task, generating a reminder message for the selected task, or for performing other actions with respect to the selected task.

According to another aspect of the present invention, a method is provided for viewing and managing collaboration data from within the context of a shared electronic document that includes a first user interface pane for editing the electronic document. A second user interface pane is also provided that is displayed in conjunction with the first user interface pane for viewing and managing the collaboration data.

According to this aspect of the invention, the second user interface pane includes a first user interface object which, when selected, will cause a description of one or more additional shared documents to be displayed. Each description of a shared document may be selected and, in response thereto, one or more actions that may be performed with respect to the selected document may be displayed. According to aspects of the invention, the actions that may be performed with respect to a selected document include deleting the selected document, setting an alert that will cause a notification to be provided in the event the selected document is modified, or adding a new document to the list. Other actions may also be performed with respect to displayed documents.

According to yet another aspect of the invention, a method may be provided for viewing and managing collaboration data within the context of a shared document that includes a first user interface pane for editing the shared electronic document and a second user interface pane displayed adjacent to the first user interface pane for viewing and managing the collaboration data. According to this aspect of the invention, the second user interface pane includes a first user interface object which, when selected, will cause one or more links to documents or sites related to the collaboration project to be displayed. If one of the links is selected, a web browser application program may be opened and directed to the network address specified by the selected link. Links may also be added or removed from the list.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE DRAWINGS

FIGS. 4-13 are screen diagrams illustrating various aspects of a user interface for viewing and managing collaboration data within the context of a shared document according to various embodiments of the invention.

DETAILED DESCRIPTION OF THE INVENTION

Figure 1:
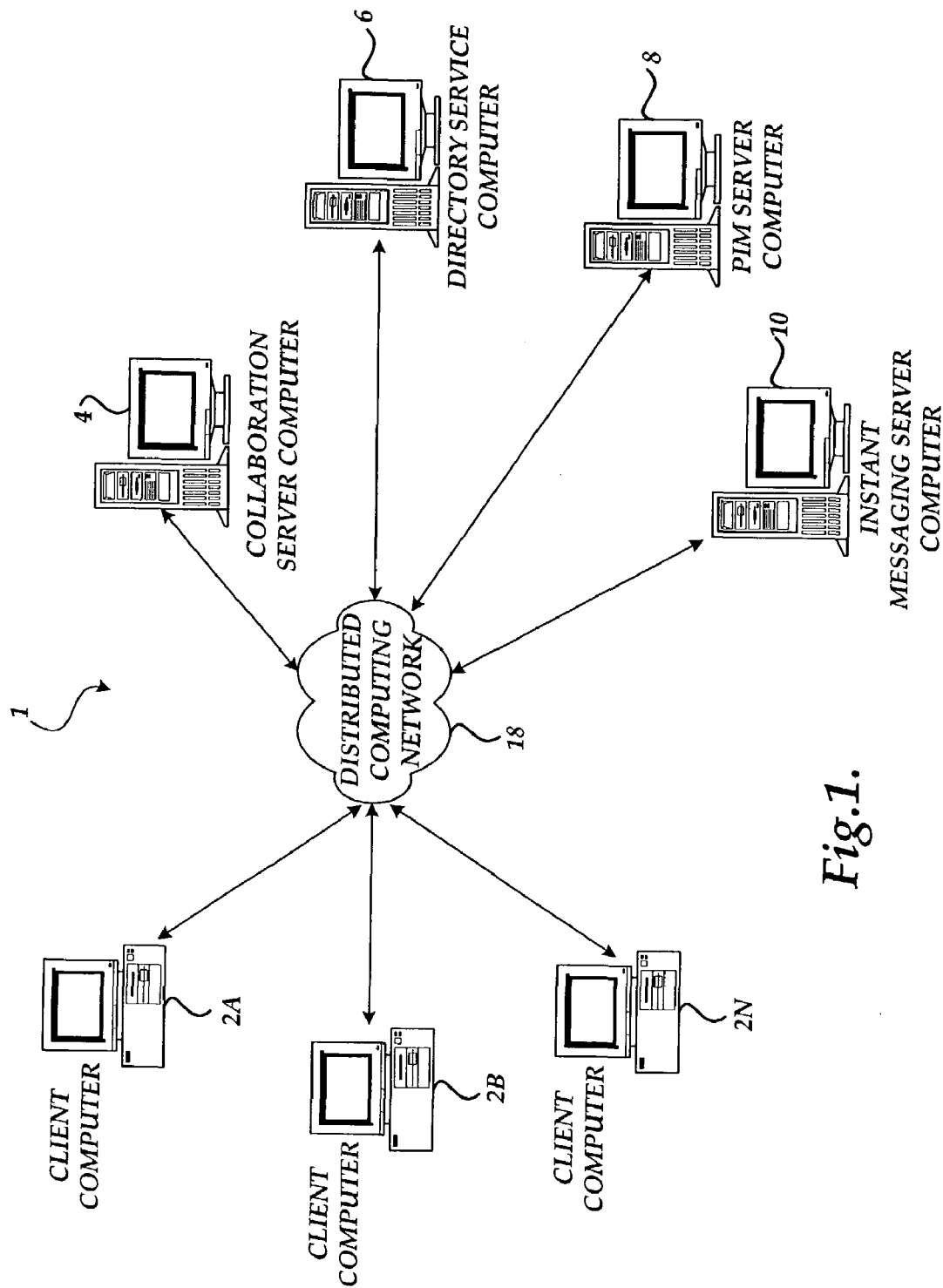
FIG. 1 is a computer system architecture diagram illustrating a computer system utilized in and provided by the various embodiments of the invention.

Referring now to the drawings, in which like numerals represent like elements, a computer hardware and software architecture utilized by a computer system provided in the various embodiments of the invention will be described. In particular, FIGS. 1-3 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a computer system architecture will be described that is provided by and utilized in the various embodiments of the invention. As shown in FIG. 1, a system 1 is provided that includes one or more client computers 2A-2N. The client computers 2A-2N comprise standard desktop or laptop computers connected to a distributed computing network 18. The client computers 2A-2N are operative to provide data processing services, such as word processing services, spreadsheet creation and editing services, presentation creation and editing services, and other types of application services typically provided by a standard desktop computer.

The client computers 2A-2N are also operative to communicate through the distributed computing network 18 to a collaboration server computer 4. As will be described in greater detail below, the collaboration server computer 4 comprises a server computer configured to provide functionality enabling users of one or more client computers 2A-2N to work as a collaborative team on projects. This functionality may include the ability to store documents utilized by each of the collaborators, the identity of each collaborator, tasks to be perform in conjunction with the collaborative project, notes relating to the collaborative project, discussions between the collaborators, and other type of information. Additional details regarding the use and operation of the collaboration server computer 4 will be provided in greater detail below with respect to FIG. 3.

According to various embodiments of the invention, the client computers 2A-2N may further be operative to communicate with a directory service computer 6 through the distributed computing network 18. The directory service computer 6 is operative to provide data regarding users of the client computer 2A-2N, such as the user's name, telephone number, office location, and other similar information. A PIM server computer 8 may also be utilized by users of the client computers 2A-2N. As known to those skilled in the art, the PIM server computer 8 is operative to maintain a calendar, e-mail inbox, task list, notes, contacts, and other information for users of the client computers 2A-2N. Additional details regarding the operation of the PIM server computer 8 will be provided below with respect to FIG. 3.

According to various embodiments of the invention, software applications executing on the client computers 2A-2N may also be operative to utilize an IM server computer 10. Through the IM server computer 10, each of the client computers 2A-2N may initiate and participate in instant messaging communications with one another. For instance, a user of the client computer 2A may initiate a instant messaging session directed toward a user of client computer 2B. When initiated, a message is transmitted through the instant messaging server computer 10 and routed to the client computer 2B. In this manner, users of individual client computers 2A-2N may effectively communicate in real time with one another. Additional details regarding the use and operation of the IM server computer 10 will be described below with respect to FIG. 3.

Figure 2:
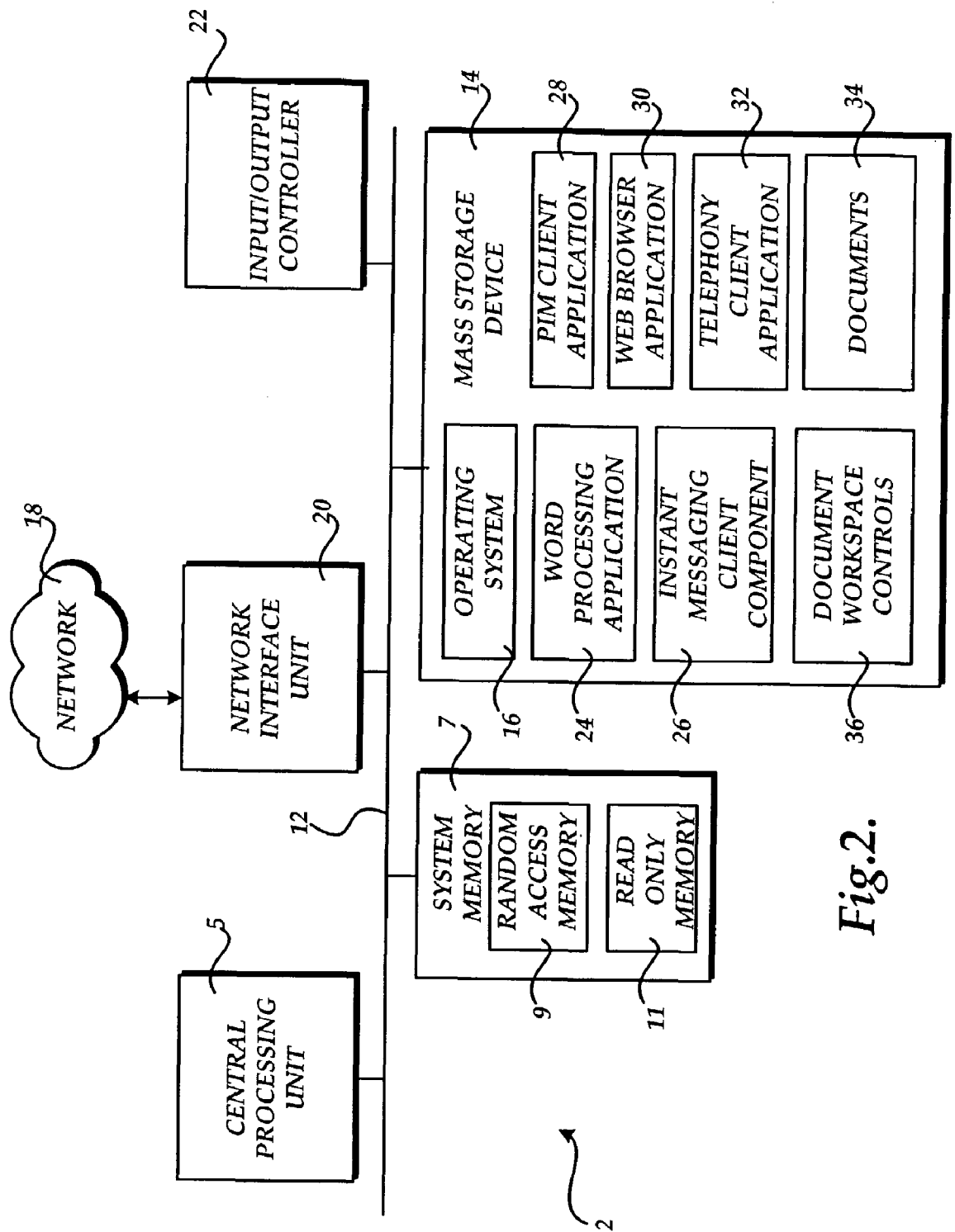
FIG. 2 is a computer architecture diagram showing an illustrative hardware and software architecture for a client computer provided in the various embodiments of the invention.

Turning now to FIG. 2, an illustrative computer architecture for a client computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the client computer 2 or the server computer 30, described below.

According to various embodiments of the invention, the client computer 2 may operate in a networked environment using logical connections to remote computers, such as the server computers 4, 6, 8, and 10, through a distributed computing network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application 24. As known to those skilled in the art, the word processing application 24 is operative to provide functionality for creating and editing word processing documents. As will be described in greater detail below, the word processing application 24 provided in the various embodiments of the invention is further operative to provide a user interface for viewing and managing collaboration data from within the context of a shared electronic document. In one embodiment of the invention, the word processing application 24 comprises the MICROSOFT WORD word processing application from MICROSOFT CORPORATION of Redmond, Wash. It should be appreciated that although the embodiments of the invention described herein are described in the context of a word processing application, other types of application programs may also embody the various aspects of the invention. For instance, the various aspects of the invention for viewing and managing collaboration data from within the context of a shared document may be utilized in conjunction with spreadsheet application programs, presentation application programs, diagramming application programs, note taking applications, project scheduling applications, and any other type of application program in which shared documents may be created or edited.

The mass storage device 14 and RAM 9 may also store an IM client component 26. The IM client component 26 comprises of executable software program operative to communicate with the IM server computer 10 to provide instant messaging functionality to the client computer 2. As will be described in greater detail below, the word processing application 24 may utilize the IM client component 26 and the IM server computer 10 to obtain the on-line and off-line status of co-collaborators on a shared electronic document. The IM client component 26 may also be utilized to initiate and engage in instant messaging communications between co-collaborators utilizing the client computers 2A-2N. In one embodiment of the invention, the IM client component 26 comprises the MESSENGER instant messaging client component from MICROSOFT CORPORATION of Redmond, Wash.

The mass storage device 14 and the RAM 9 may also store a PIM client application 28. As described briefly above, the PIM client application 28 comprises an executable software component operative to provide functionality for managing personal information, including e-mail messages, calendars, contacts, task, notes, and other personal information. According to one embodiment of the invention, the PIM client application 28 comprises the OUTLOOK messaging and PIM application for MICROSOFT CORPORATION of Redmond, Wash. Moreover, as will be described in greater detail below, the word processing application 24 may utilize data stored and maintained by the PIM client application 28 regarding co-collaborators. It should be appreciated that embodiments of the invention may be implemented with other types of PIM and e-mail clients from other manufacturers.

According to the various embodiments of the invention, the mass storage device 14 and the RAM 9 may store a Web browser application 30. As known to those skilled in the art, the Web browser application 30 is operative to request and receive web pages formatted in the hypertext markup language ("HTML") and other types of markup languages from remote or local server computers. The Web browser application 30 is also operative to format and display the received information for the consumption of a user. As will be discussed in greater detail below, the web browser application 30 may be utilized by the user of the client computer 2 to interact with a collaboration project site provided by the collaboration server computer 4. According to one embodiment of the invention, the Web browser application 30 comprises the INTERNET EXPLORER Web browser application from MICROSOFT CORPORATION. However, it should be appreciated that Web browsers available from other manufacturers may be utilized in a similar manner as described herein.

According to the various embodiments of the invention, the mass storage device 14 and the RAM 9 may also store a telephony client application 32. The telephony client application 32 is operative to use hardware installed in the client computer 2 to initiate voice or voice and video telephone communications to other users of the client computers 2A-2N. It should be appreciated that the telephony client application 32 may simply utilize a modem contained in the client computer 2 to dial a telephone number of another co-collaborator. Alternatively, the telephony client application 32 may utilize data communications to initiate a voice communication with another co-collaborator over the distributed computing network 18.

The mass storage device 14 and RAM 9 may also store one or more document workspace controls 36. As will be described in greater detail below with respect to FIGS. 4-13, the document workspace controls 36 are utilized by the word processing application 24 to provide a user interface for viewing and managing collaboration data within the context of a shared document. In this regard, the document 34 may be utilize by the word processing application 24 and stored at the client computer 2 or the collaboration server computer 4, or both. The document workspace controls 36 are operative to provide a collaboration pane adjacent to a document editing pane for displaying the collaboration data. Additional details regarding the collaboration pane provided by the document workspace controls 36 and its utilization will be provided below with respect to FIGS. 4-17.

Figure 3:
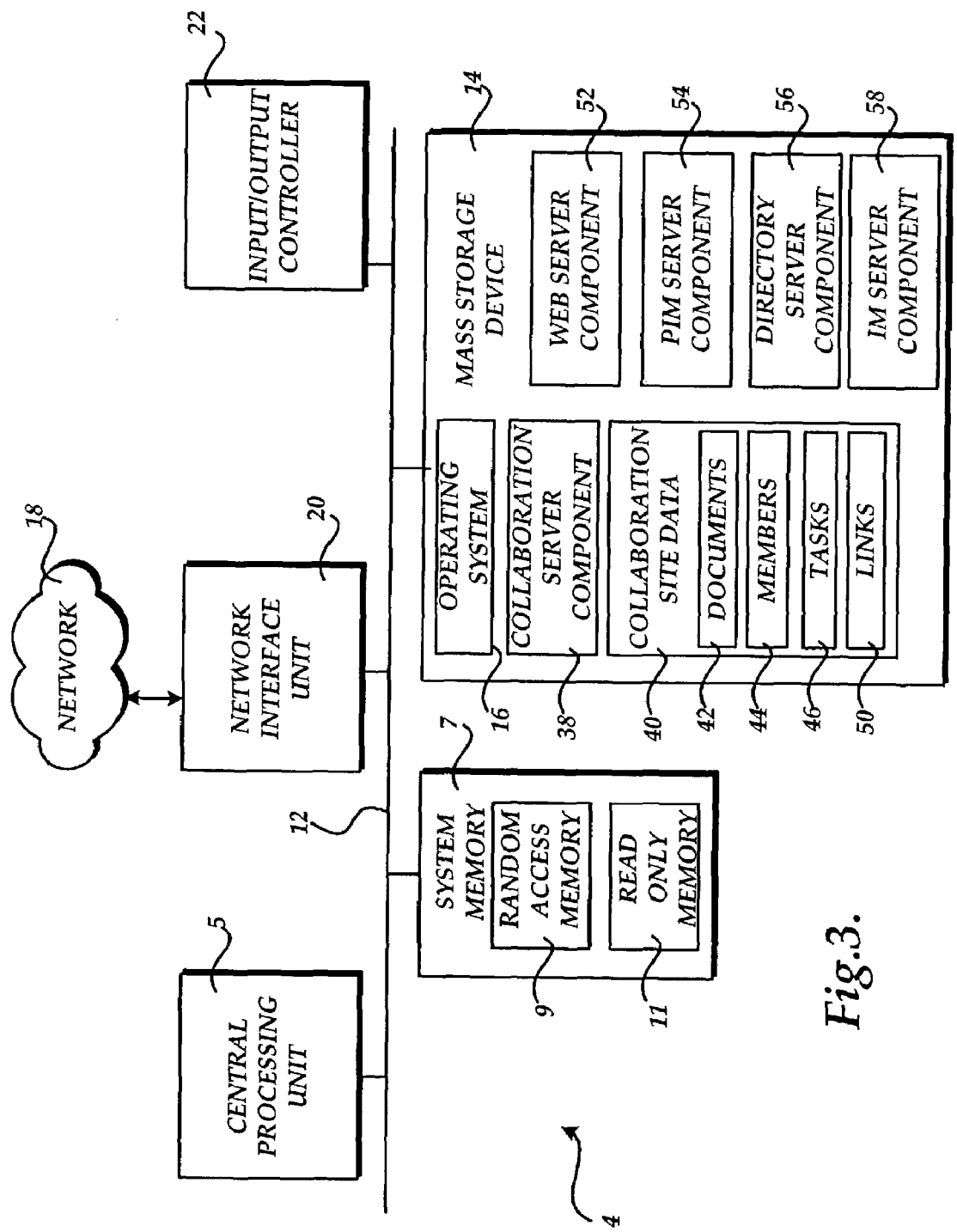
FIG. 3 is a computer architecture diagram showing an illustrative hardware and software architecture for a server computer utilized in the various embodiments of the invention.

Referring now to FIG. 3, additional details regarding the hardware architecture and software components utilized by the collaboration server computer 4 will be described. As shown in FIG. 3, the collaboration server computer 4 includes many of the conventional components of the client computer 2, such as a CPU 5, a system memory 7, and a mass storage device 14. Additionally, the collaboration server computer 4 is operative to store in the mass storage device 14 and RAM 9, a collaboration server component 38.

The collaboration server component 38 comprises an executable software component operative to maintain and provide access to collaboration project sites, also called collaboration projects herein, for use by one or more collaborators utilizing the client computers 2A-2N. In this regard, the collaboration server component 38 may store collaboration site data 40 utilized by the co-collaborators on a collaboration project. According to the various embodiments of the invention, the collaboration site data 40 may include documents 42, identities of the various members 44, or co-collaborators of a collaboration site, tasks to be performed with respect to the collaboration site, and links 50 to other sites or data. According to one embodiment of the invention, the collaboration server component 38 comprises the WINDOWS SHAREPOINT SERVICES application program from MICROSOFT CORPORATION of Redmond, Wash. It should be APPRECIATED, however, that server application components available from other manufacturers for creating and facilitating collaboration sites may also benefit from the various aspects of the present invention described herein.

As will be discussed in greater detail below, the collaboration site data 40 maintained by the collaboration server component 38 may be accessed from within the context of a shared electronic document. However, the data maintained by the collaboration server component 38 may also be accessed through the use of the Web browser application program 30. In this regard, the collaboration server component 38 is operative to utilize a Web server component 52 for receiving and responding to request for the collaboration site data 40. Web pages may be created and stored on the collaboration server computer 4 for providing access to the collaboration site data 40, and for performing functions related to the collaboration site, such as adding new members, documents, task, discussions, reminders, and other information. The use of the word processing application 24 executing on the client computer 2 to access and maintain this data in the context of a shared electronic document will be described in greater detail below with respect to FIGS. 4-17.

As discussed briefly above, the collaboration server computer 4 may also be operative to execute a PIM server component 54. The PIM server component 54 comprises an executable software component operative to maintain calendar, e-mail, task, notes, contact, and other information for a multitude of users. The data maintained by the PIM server component 54 may be accessed by a user through the use of a PIM client application 28 executing on the client computer 2. According to one embodiment of the invention, the PIM server component 54 comprises the EXCHANGE PIM server component available from MICROSOFT CORPORATION. Other PIM server components from other manufactures may also be utilized similarly.

The collaboration server computer 4 may also be operative to execute a directory server component 56. The director server component 56 is operative to maintain information regarding a multitude of users such as the user's name, e-mail address, telephone numbers, office location, and other useful information. One example of a directory server component 56 comprises the ACTIVEDIRECTORY server component from MICROSOFT CORPORATION. Other types of directory servers providing this information may also be similarly utilized.

The collaboration server computer 4 may also be operative to execute an IM server component 58. As discussed briefly above, the IM server component 58 comprises an executable software component operative to facilitate instant messaging communications between two or more client computer 2A-2N. The IM server component 58 may comprise a server component operative for use with the MESSENGER IM client application in the various embodiments described herein. However, IM server components utilized and provided by other manufacturers may also be utilized similarly.

It should be appreciated that although the collaboration server component 38, web server component 52, PIM server component 54, directory server component 56, and IM server component 58, are illustrated as being stored and executed on a single collaborative server computer 4, other variations may be utilized. For instance, the collaboration server component 38 may be utilized at a collaboration server computer 4, the PIM server component 54 may be utilized at a PIM server computer 8, the directory server component 56 may be utilized at a directory service computer 6, and the IM server component 58 may be utilized at an IM server computer 10. It should be appreciated that the software components described herein may be executed on any computer available through a distributed computing network 18 and that any possible configuration of these software components on the various server computers may be utilized.

Figure 4:
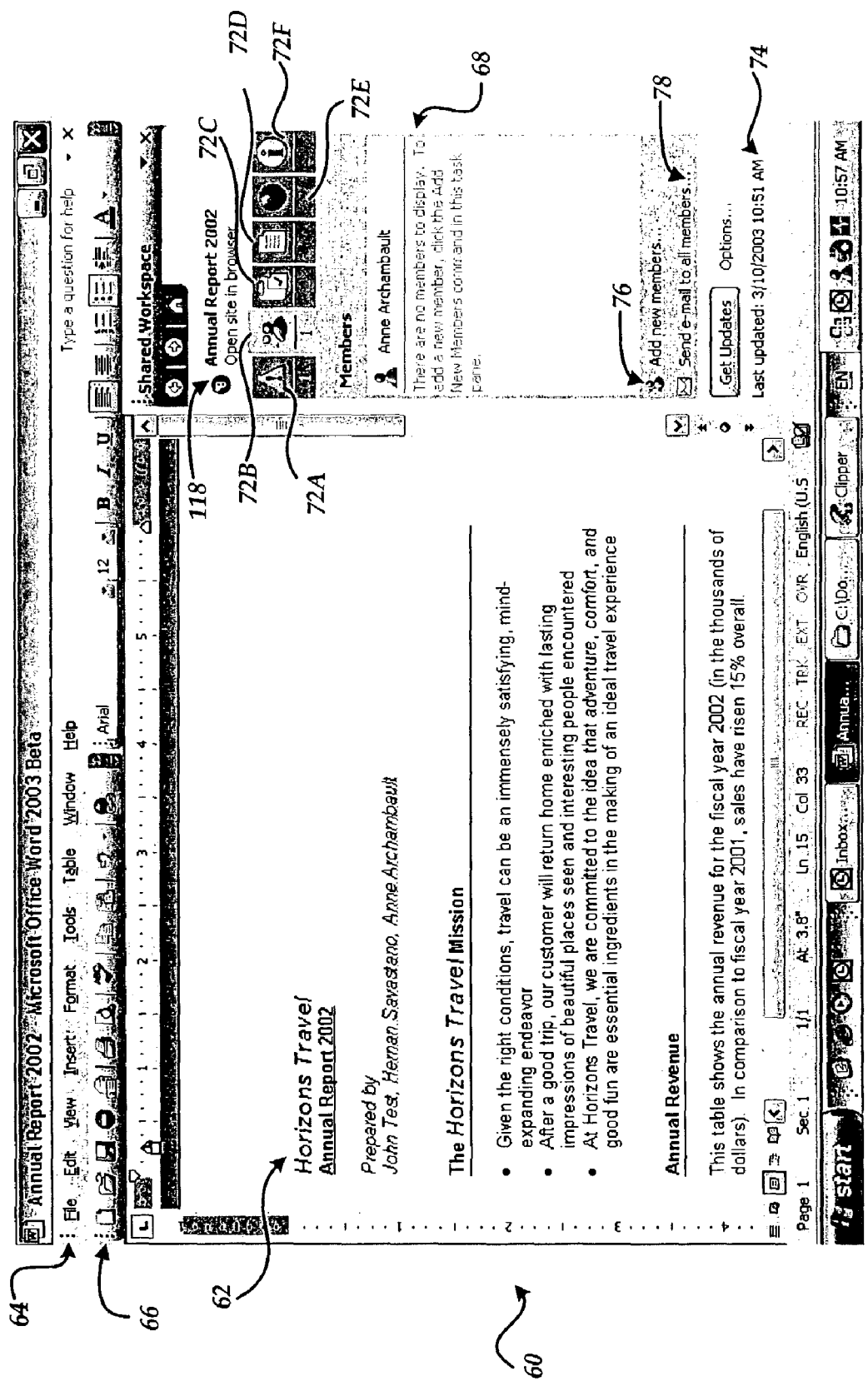

Referring now to FIG. 4, an illustrative user interface 60 provided by a word processing application 24 in one embodiment of the invention will be described. As shown in FIG. 4, the user interface 60 includes many conventional components provided by word processing applications for editing word processing documents. In particular, the user interface 60 includes a document editing pane 62. In the document editing pane, a word processing document is displayed and commands are received from a user for editing the electronic document. As known to those skilled in the art, the user may add text or other types of data, remove text or other types of data, apply formatting to the text or data, and perform other types of functions while working in the document editing pane 62. In order to facilitate and provide this type of functionality, a tool bar 66 is displayed in the user interface 60. The tool bar 66 provides access to various functions of the word processor application 24, including functions for opening documents, saving documents, transmitting documents to other users, printing documents, and other types of functionality. In this regard, a menu bar 64 is also provided that facilitates access to other editing tools provided by the word processing application 24.

According to the various embodiments of the invention, the user interface 60 provided by the word processing application 24 further includes a workspace pane 68, also described herein as a collaboration pane 68, that provides access to collaboration data maintained and stored at the collaboration server 4. In particular, the collaboration pane 68 includes one or more tabs 72A -72F for accessing the data stored at the collaboration server computer 4. In particular, the tab 72B is utilized to provide functionality for displaying the co-collaborators authorized on a particular collaboration project site. Additionally, as will be described in greater detail below, various functions may be performed with respect to the co-collaborators when the tab 72B is selected.

The tab 72C provides functionality for accessing and performing functions related to tasks associated with the selected collaboration project site. Similarly, the tab 72D is utilized to display and provide functionality relating to documents contained within a particular collaboration project site. The tab 72E is utilized to display and perform functions related to other web sites or collaboration project sites related to the currently selected collaboration project sites. The tab 72F is utilized to display information regarding the currently selected document. Additional details regarding the operation and use of each of the tabs 72A-72F will be provided below with respect to FIGS. 6-13.

According to the various embodiments of the invention, the collaboration pane 68 may also include text 118 identifying a title for the currently opened collaboration project site. For instance, as shown in FIG. 4, the text "annual report 2002" is displayed indicating that a collaboration project site relating to an Annual Report is currently open. A hyperlink is also displayed adjacent to the text 118 which, when selected, will cause the Web browser 30 to display a web page provided by the collaboration server computer 4 relating to the currently open collaboration project site. According to the various embodiments of the invention, text 74 is also displayed indicating the status of the collaboration pane 68. As shown in FIG. 4, the text 74 indicates that the contents of the collaboration pane 68 were last updated at a particular time and date.

As also shown in FIG. 4, the collaboration pane 68 includes a list of members, or co-collaborators, of the currently opened collaboration project site. In the user interface 60 illustrated in FIG. 4, no members have been added to the currently opened project site. As a result, only the identity of the current user of the client computer 2 is identified in the list of co-collaborators. In order to add new members to the currently opened collaboration project site, a button 76 may be selected to add new members. A button 78 may also be selected to send an e-mail messages to all of the co-collaborators on the project site simultaneously. An illustrative user interface for adding new members to the currently selected collaboration project site is described below with respect to FIGS. 5A-5B.

In the various embodiments of the invention, the contents of the collaboration pane 68 are periodically updated by contacting the various server computers and retrieving updated content. For instance, according to one embodiment of the invention, the contents of the collaboration pane 68 are updated every ten minutes. When a periodic update is performed, the information retrieved from the server computer is utilized to update the contents of the collaboration pane 68. As will be described in greater detail below, the contents of the collaboration pane 68 may also be manually updated in response to the selection of a user interface object provided within the collaboration pane 68.

Figures 5A, 5B:
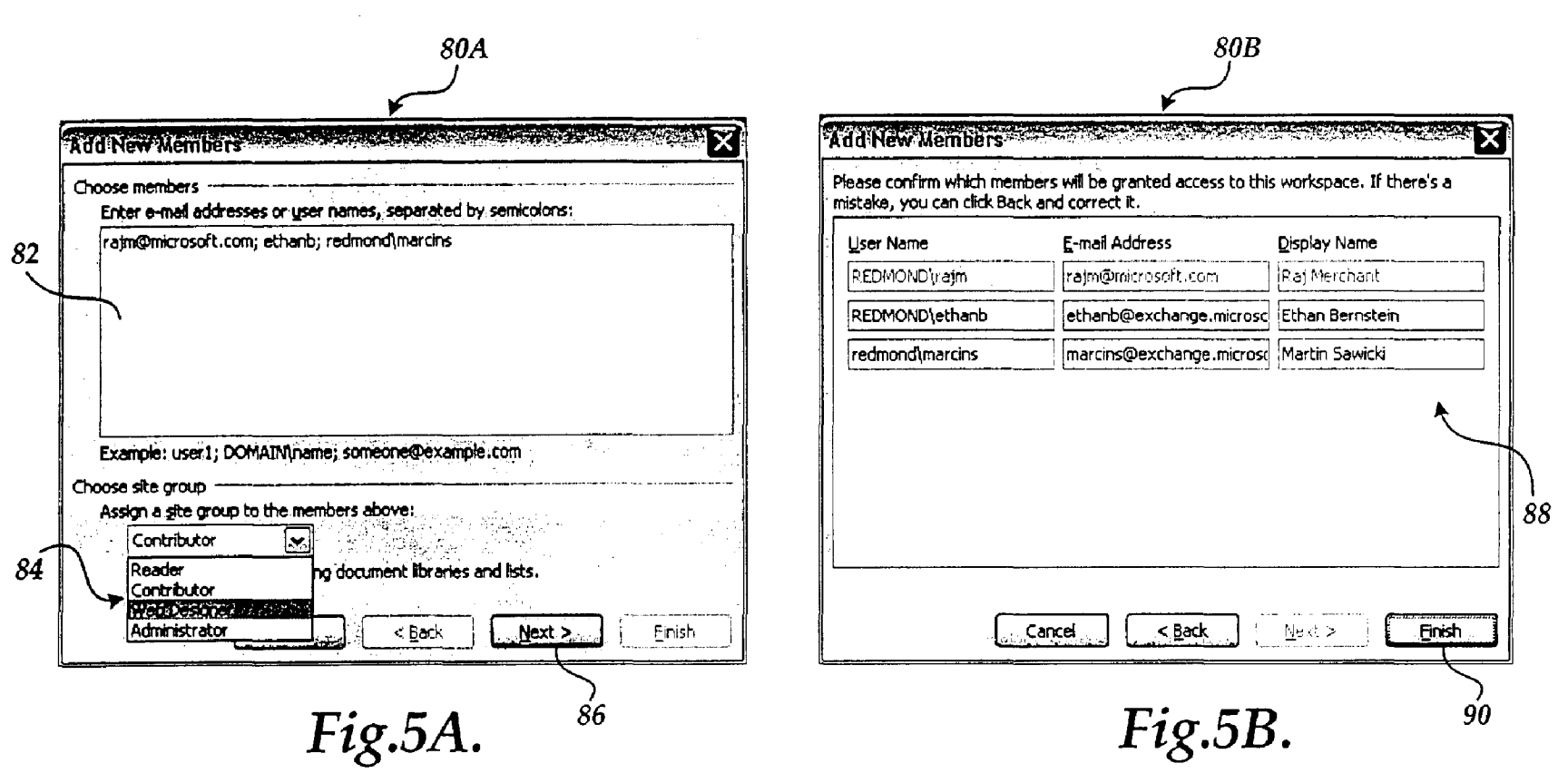

Referring now to FIGS. 5A and 5B, an illustrative user interface for adding new members to a group of co-collaborators on a collaboration project site will be described. As discussed above briefly with respect to FIG. 4, selection of the button 76 in the user interface 60 initiates a process for adding new members. In particular, when the button 76 is selected, the user interface 80A is displayed. The user interface 80A includes a text entry field 82 wherein the e-mail addresses or user names of the individuals to be added to the list of co-collaborators may be entered. Moreover, a menu portion 84 is displayed wherein a site group may be assigned to each of the members identified within the text field 82. In this manner, permissions may be assigned variously to the new members identified in the text entry field 82. For instance, through the use of the menu portion 84, the new members may be identified as readers, contributors, designers, or administrators of the current collaboration project site or any other user-defined or user-customized site group. When the user has completed the entry of the identities of the new members and assigned a site group to the new members, the user may continue the process by selecting the button 86.

When the button 86 has been selected, the user interface 80B illustrated in FIG. 5B is displayed. The user interface 80B includes a text display portion 88 that identifies each of the users added through the user interface 80A. In particular, the user names, e-mail addresses and a friendly display name are displayed. If the information contained in the text display portion 88 is incorrect, the user may return to the user interface 80A to correct the information. However, if the information is correct, the user may select the button 90 to complete the addition of the new co-collaborators to the currently selected collaboration project site.

Figure 6:
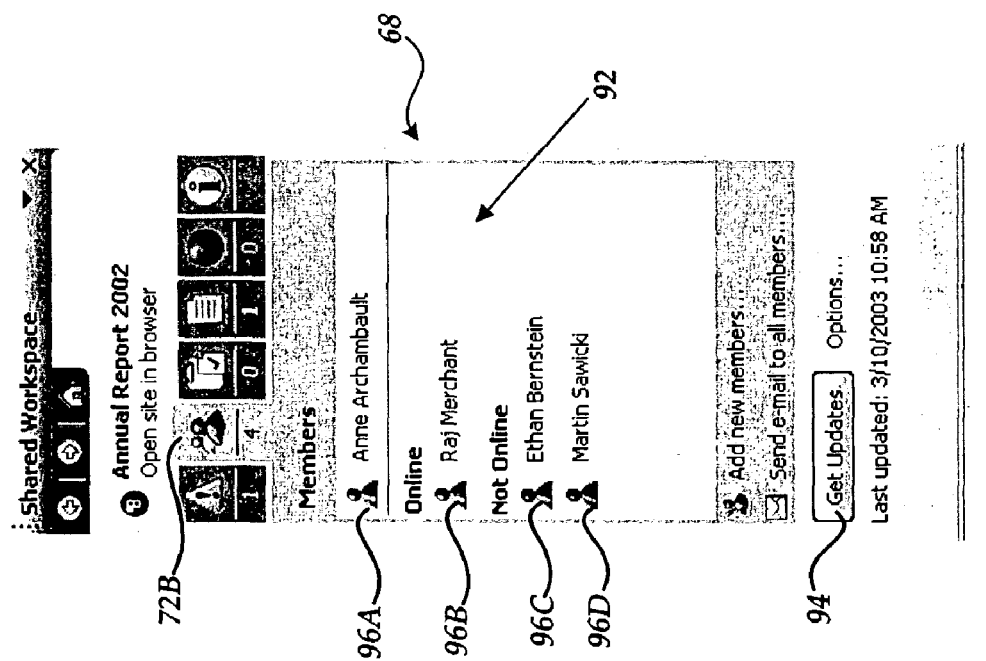

FIG. 6 illustrates the contents of the collaboration pane 68 following the addition of the three new co-collaborators as described above with respect to FIGS. 5A-5B. In particular, as shown in FIG. 6, the tab 72B is selected, thereby causing the member list 92 to be displayed. The member list 92 includes the identities 96A-96D of each of the co-collaborators, or members, of the currently selected collaboration project site. The identity 96A identifies the current user of the client computer 2 on which the collaboration pane 68 is being displayed. The identities 96B-96D identify other users that have been assigned co-collaborator status for the currently opened collaboration project site.

As shown in FIG. 6, the member list 92 also identifies an on-line or off-line state for each of the co-collaborators. In particular, the identity 96B is currently on-line, while the identities 96C-96D are currently off-line. It should be appreciated that the on-line and off-line status of a user is determined based upon whether a user has currently signed into the IM server component 58 utilizing the IM client component 26 on their respective client computer 2A-2N. Additional details regarding the process for determining whether or not a co-collaborator within the currently selected collaboration project site is on-line or off-line will be described in greater detail below.

According to various embodiments of the invention, the data contained in the member list 92, including the on-line or off-line status of each of the co-collaborators, is retrieved and utilized to created the member list 92 when the tab 72B is selected. Thereafter, a periodic determination is made regarding the identity of each of the members of the collaboration project site and their off-line or on-line status. The member list 92 is then updated with the new information. If a user desires to update the contents of the member list 92 between the periodic updates, the user may select the button 94 for manually updating the contents of the member list 92.

Figure 7:
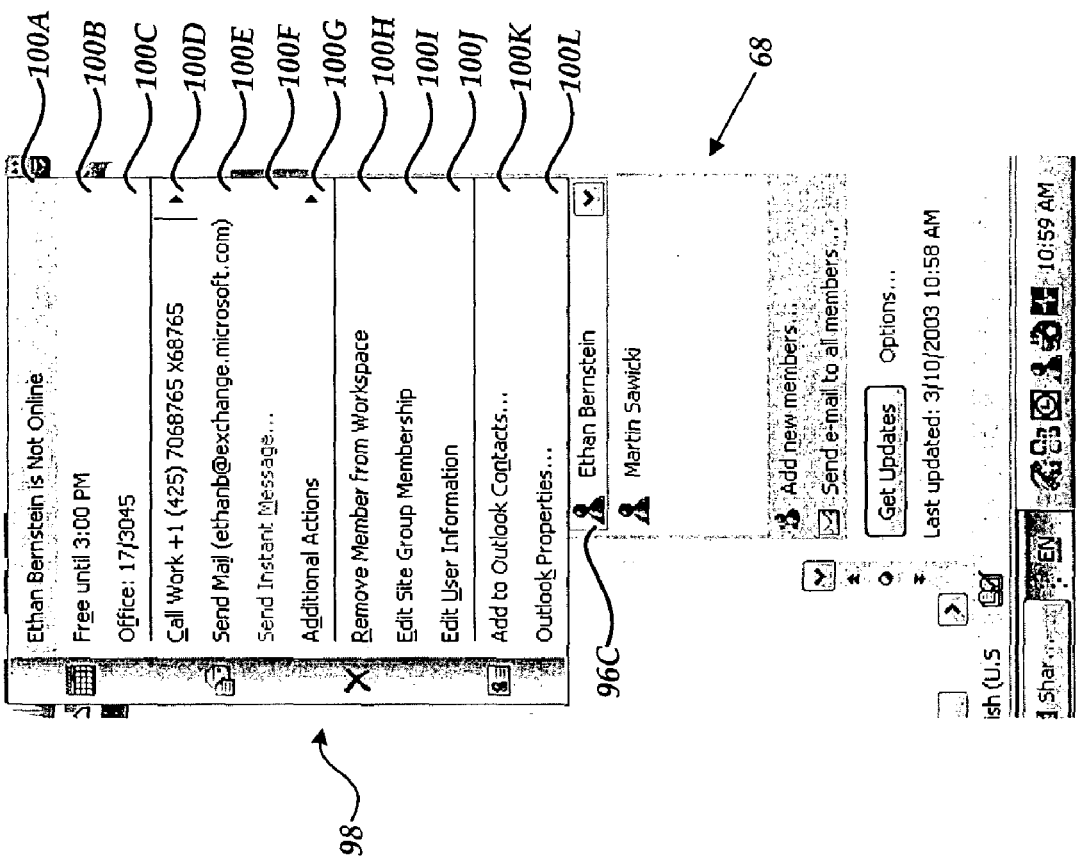

Turning now to FIG. 7, additional details regarding the use and operation of the collaboration pane 68 will be provided. As shown in FIG. 7, any of the identities 96A-96D of the members displayed in the member list 92 may be selected. For instance, the displayed identity 96C may be selected utilizing either a mouse command, a keyboard command, or other type of input command. When selected, a context menu 98 is displayed that includes information related to the selected identity 96C and commands that may be performed with respect to the selected identity 96C. In particular, according to embodiments of the invention, the context menu 98 includes a menu item 100A that identifies the current on-line or off-line status of the selected identity. If the currently selected identity is on-line, the menu 100A may be selected by a user to initiate an instant messaging conversation with the selected member. If the currently selected member is off-line, a selection of the menu item 100A will result in the creation of a new e-mail message directed toward the selected user.

The context menu 98 may also include a menu item 100B identifying calendar data for the currently selected member. The calendar data for the currently selected member may be retrieved from the PIM server computer 8. In particular, free/busy data for the selected user's calendar may be displayed. If the menu item 100B is selected, a new appointment on the currently selected member's calendar may be created.

The context menu 98 may also include a menu item 100C for providing directory information for the currently selected member. For instance, as shown in FIG. 7, the menu item 100C identifies an office location for the currently selected member. Other information available from the directory service computer 6 for the currently selected user may be similarly displayed within the context menu 98.

According to one embodiment, the context menu 98 includes a menu item 100D for placing a telephone call to the currently selected member. The telephone number to which the call may be directed is retrieved from the directory service computer 6 or from data maintained by the PIM server computer 8. Another context menu related to the menu item 100D may similarly be displayed identifying other telephone numbers at which the selected member may be reached. If selected, a voice or video telephone call may be placed to the selected telephone number by the telephony client application 32. According to one embodiment, the IM client component 26 embodies telephony features and is utilized to place the voice call.

A menu item 100E may also be displayed in the context menu 98 which, when selected, will cause a new electronic mail message to be created that is directed toward the currently selected member. The menu item 100F may also be displayed for initiating an instant messaging conversation with the currently selected member. If the currently selected member is currently off-line, the menu item 100F may be unselectable by the user. Other actions may be similarly displayed and performed through the use of the menu item 100G. For instance, actions performable by external applications may be listed under the menu item 100G.

According to embodiments of the invention, administrative functions may be performed with respect to the currently selected member through the context menu 98. These functions are performable by the current user only if the current user has appropriate privileges on the current collaboration project site. For instance, through the menu item 100H, the current user may remove the current user from the collaboration project site. Through the menu item 100I, the current user may edit membership information for all the collaborators of the current collaboration project site. Through the use of the menu item 100J, the current user may edit user information for the selected member. When any of the menu items 100H, 100I, or 100J are selected, commands may be transmitted from the client computer to the collaboration server computer 4 for completing the commands. In one embodiment, these commands comprise simple object access protocol ("SOAP") commands. In another embodiment, the selection of the menu 100H, 100I, or 100J, will cause the Web browser application 30 to be instantiated and directed to various Web pages provided by the collaboration server computer 4 for performing the respective functions.

According to one embodiment of the invention, the context menu 98 also includes a menu item 100K for adding contact properties associated with the currently selected member to a contacts database maintained by the PIM client application 28. In this regard, the properties associated with the currently selected member in the database maintained by the PIM client application 28 may be viewed by selecting the menu item 100L. It should be appreciated that the functionality provided through the selection of the menu items 100A-100L is merely illustrative and that other types of functions may be performed with respect to the currently selected member.

Referring now to FIG. 8, additional details regarding the operation of the collaboration pane 68 will be described. In particular, FIG. 8 illustrates the contents of the collaboration pane after the selection of the tab 72C. As discussed briefly above, the tab 72C causes collaboration data maintained at the collaboration server computer 4 relating to tasks to be performed in conjunction with the currently opened collaboration project site to be displayed. In this regard, a task list 102 is displayed following the selection of the tab 72C. The task list 102 identifies one or more tasks 104A-104B to be performed with respect to the currently selected collaboration project. It should be appreciated that multiple tasks lists may be utilized for a single site. According to one embodiment, the oldest task list is displayed when multiple task lists exist. It should also be appreciated that the tasks displayed in the task list 102 may or may not directly relate to the shared electronic document currently being displayed and edited in the document editing pane 62. Each of the tasks 104A-104B identifies the subject matter of the task, its priority, the member to which the task has been assigned, and a due date for completion of the task. Other information may similarly be displayed. Each task also includes a checkbox which, has three states: incomplete, complete, and in progress/deferred/waiting on someone. Each task may also be selected to perform other functions such as deleting or editing task properties such as title, member to which the task is assigned, due date, priority, date modified, and other properties.

When the tab 72C is selected, the collaboration pane 68 also includes buttons for performing functions with respect to the task list 102. In particular, buttons may be provided for adding a new task to the task list 102, requesting that a reminder be provided with respect to any task in the task list 102, and for performing other functions. As discussed above with respect to the tab 72B, the contents of the task list 102 are updated periodically by the document workspace controls 36. A user may also request a manual update of the contents of the task list 102 through a selection of the update button displayed within the collaboration pane 68.

Referring now to FIG. 9, additional details regarding the contents of the collaboration pane 68 when the tab 72D is selected will be provided. As described briefly above, the tab 72D causes the contents of the collaboration pane 68 to display a documents list 106. The documents list 106 identifies each of the documents 108A maintained by the collaboration server computer 4 within the currently selected collaboration project site. In the example user interface display shown in FIG. 9, only a single document 108 is included within the currently selected collaboration project site. Through buttons provided within the collaboration pane 68, new documents or folders may be added to the currently selected collaboration project site and alerts may be created for each of the selected documents. The contents of the documents list 106 are updated periodically and may be updated manually by user in the manner described above. It should be appreciated that multiple document lists may be maintained for each site. According to one embodiment, if multiple lists exist, the library to which the current document belongs is displayed.

As shown in FIG. 10, any of the documents contained within the documents list 106 may be selected by a user. When selected, a context menu 110 is displayed for the selected document. Through the menu items 112A-112G, displayed within the context menu 110, a number of functions may be performed with respect to the selected document. In particular, the menu item 112A will cause the selected document to be opened in the word processing application 24. If the selected document is already opened within the word processing application 24, the menu item 112A will be unavailable. The menu item 112B will cause the selected document to be deleted from the current collaboration project site. The menu item 1 12C will cause an alert to be created corresponding to the selected document. For instance, if the selected document is modified by another user an alert may be generated. The menu items 112D-112G may also be selected for checking the status of the selected document, retrieving document information for the selected document, receiving document updates, or saving an updateable copy of the selected document, respectively.

Referring now to FIG. 11, additional details regarding the operation of the collaboration pane 68 with respect to the selection of tab 72E will be described. As discussed briefly above, selection of the tab 72E causes a links list 114 to be displayed within the collaboration pane 68. The links list 114 includes hyperlinks to other collaboration project sites or web sites related to or associated with the current collaboration project site. As shown in FIG. 11, the link 116A comprises a link to another collaboration project site. When selected, the link 116A will cause the web browser application 30 to be executed and directed toward the hyperlink specified by the selected site. It should be appreciated that when the tab 72E is selected, buttons may be provided within the collaboration pane 68 for adding new links to the links list 114, generating alerts regarding selected links, and for manually updating the contents of the links list 114. It should also be appreciated that multiple links lists may be maintained for a site. According to one embodiment, the oldest links list is displayed in the event that multiple lists exist.

Turning now to FIG. 12, additional details regarding the contents of the collaboration pane 68 when the tab 72F is selected will be provided. As discussed briefly above, the tab 72F cause a text pane 116 to be displayed that contains information regarding the document currently being edited within the document editing pane 62 to be displayed. In particular, according to one embodiment of the invention, the text pane 116 includes text identifying the creator of the current document, the identity of the last member to have modified the document, and the last date and time of modification. The tab 72F may also be utilized to create or display metadata associated with the document library to which the current document belongs. For instance, a document library about legal contracts might be modified to include the name of each lawyer and paralegal responsible for the contract. When such a contract is opened in a word processing application program, the tab 72F would include information identifying the creator, the user that last modified the document, the date of the last modification, and information identifying each lawyer and paralegal responsible for the document. Additionally, when the tab 72F is selected, buttons are provided within the collaboration pane 68 for restricting the editing permissions of the current document, displaying a version history for the current document, and for creating alerts for the current document, such as for generating an alert when the current document is modified by another member.

Turning now to FIG. 13, additional aspects regarding the operation of the collaboration pane will be provided. As discussed briefly above, the collaboration pane 68 includes text 118 identifying the title of the currently selected collaboration project. When the text 118 is selected, a context menu 120 may be displayed including a number of menu items 122A-122G for performing functions with respect to the currently selected collaboration project site. In particular, a menu item 122A may be provided which, when selected, will cause a web site maintained by the collaboration server computer 4 with respect to the currently selected collaboration project site to be opened in the web browser application 30. The menu items 122B and 122C may also be utilized for renaming the currently selected collaboration project site or for changing other settings of the currently selected collaboration project site, respectively. As discussed above, when selected the menu items 122B and 122C may cause a SOAP command to be transmitted to the collaboration server computer 4 for performing these functions. Alternatively, the Web browser application 30 may be opened and directed to web pages maintained by the collaboration server computer 4 through which these functions may be performed.

According to one embodiment of the invention, the context menu 120 also includes a menu item 122 for disconnecting the collaboration pane 68 from the currently selected collaboration workspace site. Additionally, menu items 122E and 122F may be provided for deleting the currently selected collaboration project site or for creating a new collaboration project site. The menu item 122G is also provided for publishing the current collaboration project site back to its source location on the collaboration server computer 4. It should be appreciated that other functions related to the currently selected collaboration workspace may be displayed within the context menu 120.

The logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto. Moreover, it should be recognized that the operations described herein may be executed out of order from that shown or discussed, including substantially concurrently or in reverse order, depending on the functionality involved, as would be understood by those reasonable skilled in the art of the present invention.

Figure 14:
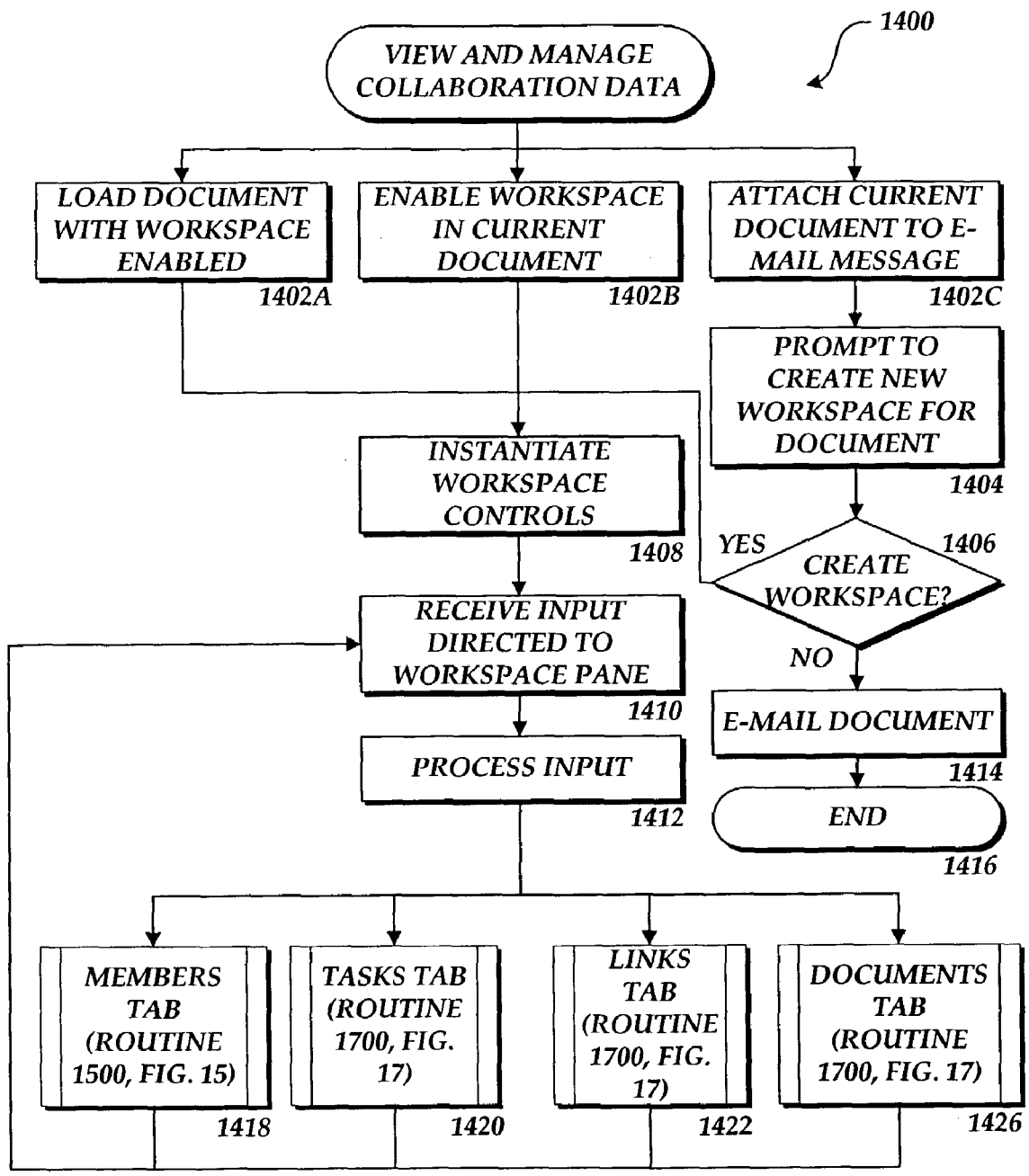
FIGS. 14-17 are flow diagrams illustrating various aspects regarding the operation of the embodiments of the invention for viewing and managing collaboration data within the context of a shared document.

Turning now to FIG. 14, an illustrative routine 400 will be described for viewing and managing collaboration data from within the context of a shared document. The routine 1400 begins at either block 1402A, 1402B, or 1402C, depending on the manner in which the use of the collaboration project site provided by the collaboration server computer 4 is instantiated. In particular, the routine 1400 begins block 1402A if a user loads a document into the word processing application 24 that has been associated with a collaboration project site on the collaboration server computer 4 previously. Alternatively, a user may create a new document utilizing the word processing application 24 and indicate to the word processing application 24 that a new collaboration project site should be created at the collaboration server computer 4 for the current document. Alternatively, the user may indicate to the word processing application 24 that the newly created document is associated with an existing collaboration project site maintained and available through the collaboration server computer 4. From either block 1402A or 1402B the routine 1400 continues to block 1408.

In addition to the mechanisms described above for enabling the use of a collaboration project site in conjunction with a current document, a third method is provided according to one embodiment of the invention. In this embodiment of the invention, the routine 1400 begins at block 1402C where a document 34 maintained at the client computer 2 is attached to a new e-mail message. The addition of a document to an e-mail message as an attachment causes a prompt to be displayed to the user asking the user if they would like to create a new collaboration project site at the collaboration server computer 4 for the document. This prompt is displayed to the user at block 1404. The routine 1400 then continues from block 1404 to block 1406, where a determination is made as to whether the user indicated that a new collaborative project site should be created at the collaboration server computer 4 for the document attached to the new e-mail message. If the user indicated that a new collaboration project site should not be created, the routine 1400 continues to block 1414 where the electronic mail message is transmitted as requested by the user without the creation of a new collaboration project site. The routine 1400 then continues to block 1416, where it ends.

If, however, at block 1406 the user indicated that a new project site should be created for the document attached to the new e-mail message, a request is transmitted to the collaboration server 4 to create the new collaboration project site. Additionally, a copy of the document attached to the e-mail message is stored at the collaboration server computer 4 and the identities of the users to which the e-mail message is being sent are added to the list of members 44 stored at the collaboration server computer 4. In this manner, a new collaboration project site may be created in response to the creation of a new e-mail message with a document attachment. From block 1406 the routine 1400 continues to block 1408.

At block 1408, the document workspace controls 36 are instantiated by the word processing application 24. By instantiating the document workspace controls 36, the collaboration pane 68 may be displayed to a user in the manner described above. Additionally, the selected documents may be opened for editing within the document editing pane 62. As shown and described above, the document editing pane is displayed adjacent to the collaboration pane so that the collaboration data maintained by the collaboration server computer 4 is easily accessible to a user of the word processing application 24.

From block 1408, the routine 1400 then continues to block 1410, where input is received at the word processing application 24. Input may be received for performing normal editing functions directed to the document editing pane 62, the menu bar 64, the tool bar 66, or other user interface features provided by the word processing application 24. Input may also be received that is directed toward the collaboration pane 68. In the event that input is received that is directed toward the collaboration pane 68, the routine 1400 continues to block 1412, where this input is processed. In particular, if a user selects the tab 72B, the routine 1400 continues from 1412 to block 1418. An illustrative routine 1500 is described in greater detail below with respect to FIG. 15 for processing the selection of the tab 72B.

If the input comprises the selection of the tab 72C, the routine 1400 continues from block 1412 to block 1420. The routine 1700 described below with respect to FIG. 17 describes an illustrative process for handling a selection of the tab 72C. If the user input directed toward the collaboration pane 68 comprises the selection of the tab 72D, the routine 1400 continues to block 1422. An illustrative routine 1700 is described below with that illustrates a method for handling the selection of the tab 72D. If the input received is directed toward the tab 72E, the routine 1400 continues from block 1412 to block 1426. An illustrative routine 1700 is described below with respect to FIG. 7 that illustrates a process for handling a selection of the tab 72E. From blocks 1418, 1420, 1422 and 1426, the routine 1400 returns back to block 1410, where additional input may be received.

Figure 15:
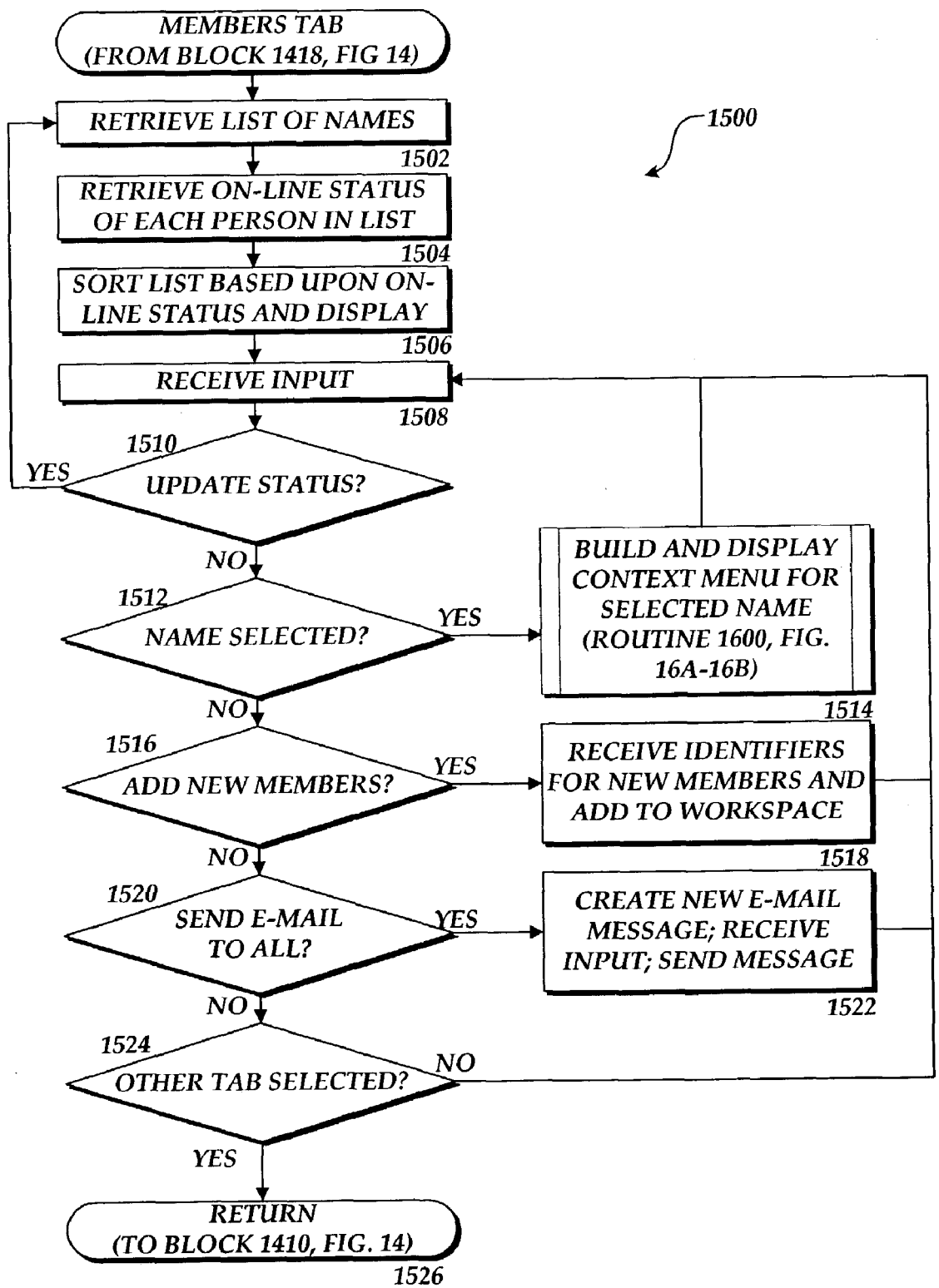

Referring now to FIG. 15, an illustrative routine 1500 will be described for processing the selection of the tab 72B for displaying the members of a collaboration project site. The routine 1500 begins at block 1502, where the identities of the members of the collaboration project site are retrieved from the collaboration server computer 4. The routine 1500 then continues to block 1504, where the on-line status of each person identified by the collaboration server computer 4 that is a member of the collaboration project site is retrieved. The on-line or off-line status of each user may be obtained by making a request to the instant messaging client component 26. The instant messaging client component 26 may, in turn, make a similar request to the IM server component 58 for data regarding the on-line or off-line status of each member.

From block 1504, the routine 1500 continues to block 1506, where the member list 92 is displayed. As discussed above, the member list 92 may be sorted based upon the on-line or off-line status of each member. In this manner, members that are on-line are listed together and members that are off-line are listed together in a separate location. The member list 92 and the other controls are then displayed to the user within the collaboration pane 68. The routine 1500 then continues to block 1508 where user input is received directed toward the collaboration pane 68.

From block 1508, the routine 1500 continues to block 1510, where a determination is made as to whether a selection has been made of the button 94 for updating the contents of the collaboration pane 68. If such a selection has been made, the routine 1500 returns back to block 1502, where the entire contents of the member list 92 is regenerated. If no such selection has been made, the routine 1500 continues to block 1512, where a determination is made as to whether the identity of one of the members of the collaboration project site has been selected. If one of the identities has been selected, the routine 1500 branches to block 1514, where the context menu 98 is built and displayed for the selected member identity. An illustrative routine 1600 is described in greater detail below with respect to FIGS. 16A-16B which illustrates this process. From block 1514, the routine 1500 returns back to block 1508, where additional input may be received.

If, at block 1512, it is determined that the identity of one of the members was not selected, the routine 1500 continues to block 1516. At block 1516, a determination is made as to whether the user interface button displayed within the collaboration pane 68 for adding new members to the collaboration project was selected. If such a selection was made, the routine 1500 continues to block 1518 where unique identifiers for each new member to be added are received and confirmed as described above with respect to FIGS. 5A-5B. Once the unique identifiers have been received and confirmed, commands are transmitted to the collaboration server computer 4 requesting that the identified members be added to the currently active collaboration project site. From block 1518, the routine 1500 returns to block 1508 where additional input may be received.

If, at block 1516, it is determined that a selection was not made for adding new members, the routine 1500 continues to block 1520. At block 1520 a determination is made as to whether the user interface button within the collaboration pane 68 was selected for transmitting an electronic mail message to each of the members of the collaboration project site. If such a selection was received, the routine 1500 branches to block 1522 where a new e-mail message is created directed toward each of the members of the collaboration project site. Input is received in the various fields of the electronic mail message and the message is transmitted to each of the intended recipients. From block 1522, the routine 1500 returns to block 1508, where additional input may be received.

If, at block 1520, it is determined that a selection was not made for sending an electronic mail message to each member of the collaboration project site, the routine 1500 continues to block 1524. At block 1524, a determination is made as to whether one of the other tabs, such as the tabs 72A, 72C, 72D, 72E or 72F was selected. If such a selection was not made, the routine 1500 returns back to block 1508 where additional user input may be received. If, however, one of the other tabs was selected, the routine 1500 continues to block 1526. At block 1526, process control returns to block 1410 described above with respect to FIG. 14, where the selection of the tab is processed.

Figure 16A:
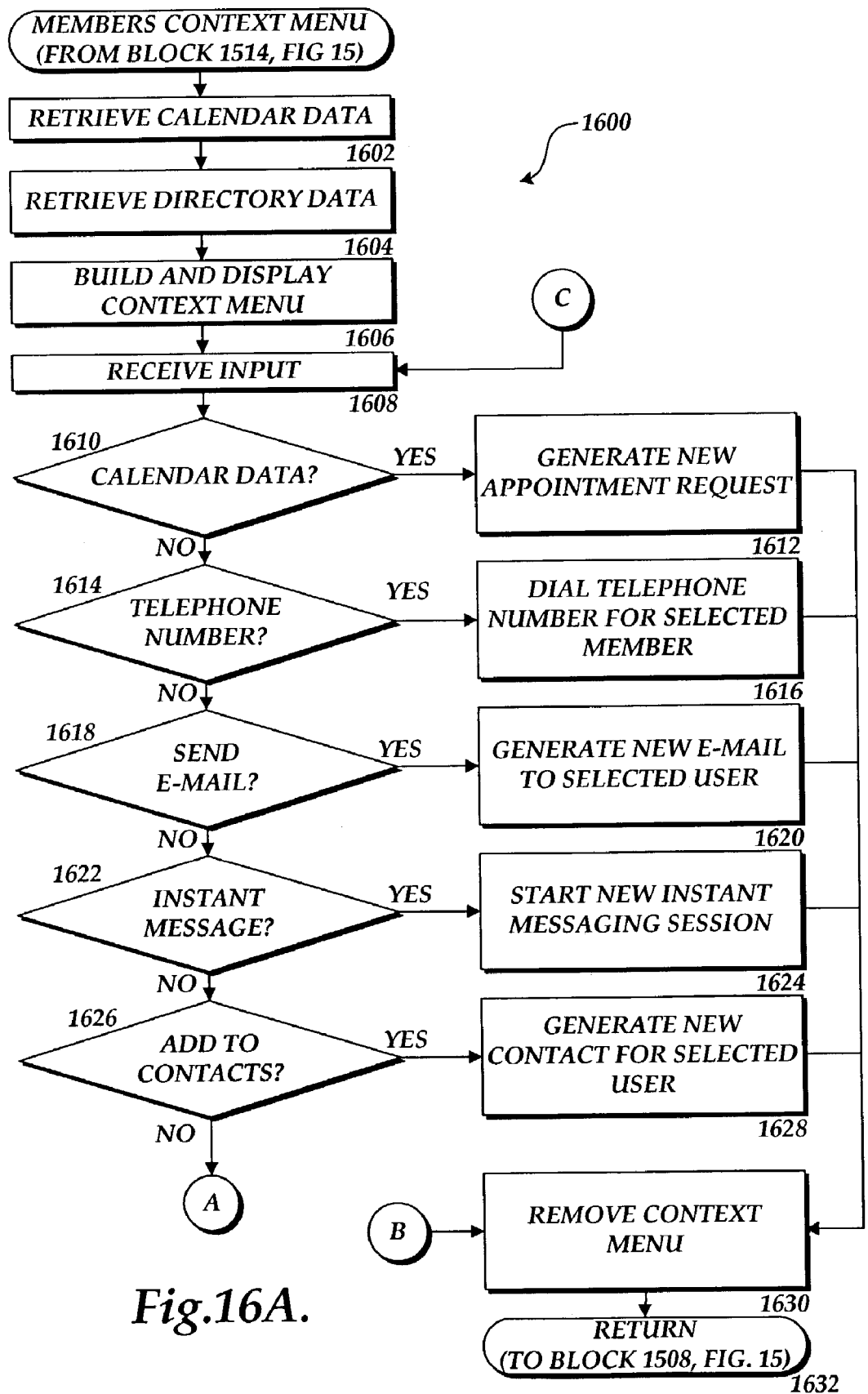
Figure 16B:
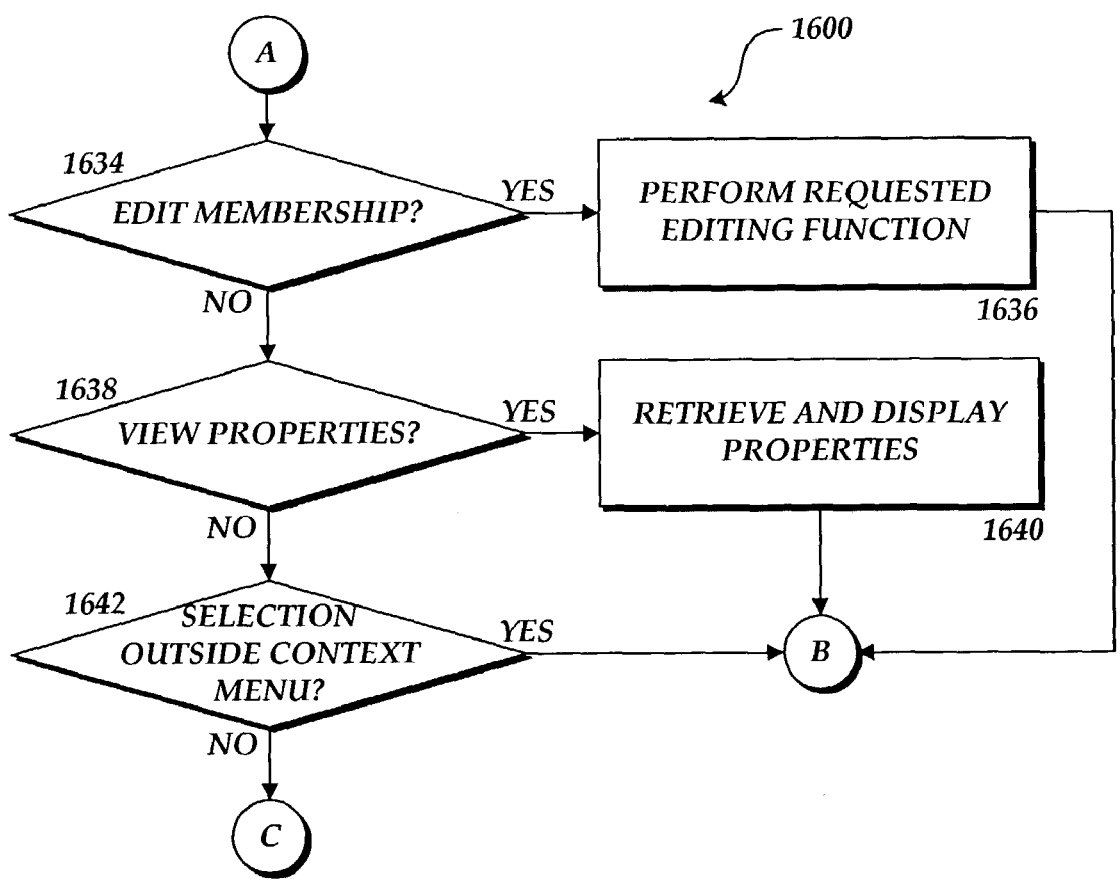

Referring now to FIGS. 16A and 16B, an illustrative routine 1600 will be described for displaying and processing input directed toward the context menu 98. The routine 1600 begins at block 1602, where calendar data for the selected member is retrieved from the PITM server component 54. As discussed briefly above, this may include free/busy data on the user's calendar for the current date. The routine 1600 then continues to block 1604, where directory data is retrieved for the selected member from the directory server component 56. Once the calendar and directory data have been retrieved, the routine 1600 continues to block 1606, where the contacts menu 98 is built and displayed to the user. The routine 1600 then continues to block 1608 where user input directed toward the contexts menu 98 is received.

From block 1608, the routine 1600 continues to block 1610 where a determination is made as to whether a selection has been made of the menu item 100B for displaying calendar data for the selected member. If such a selection has been made, the routine 1600 branches to block 1612 where a new appointment request is generated for the selected member. If such a selection has not been made, the routine 1600 continues to block 1614.

At block 1614 the determination is made as to whether a selection was received of the menu item 100 for placing a telephone call to the selected member. If such a selection was received, the routine 1600 branches to block 1616, where the telephony client application 32 is utilized to place a voice or video call to the selected member. If no such selection was made, the routine continues from block 1614 to block 1618.

At block 1618, a determination is made as to whether a selection was received of the menu item 100E for transmitting an electronic mail message to the selected member. If such a selection was made, the routine 1600 branches to block 1620 where a new electronic mail message is created directed toward the selected member. Once completed, the new e-mail message may be transmitted to the selected member through the PIM client application 28. If a selection of the menu item 100E was not received at block 1618, the routine 1600 continues from block 1618 to block 1622.

At block 1622, a determination is made as to whether a selection was received of the menu item 100F for initiating an instant messaging conversation with the selected member. If such a selection was made, the routine 1600 branches to block 1624 where a new instant messaging session is initiated with the selected member through the instant messaging client component 26. If such a selection was not received at block 1622, the routine 1600 continues to block 1626.

At block 1626, a determination is made as to whether a request was received to add the selected member to the contacts database maintained by the PIM client application 28 through the selection of the menu item 100K. If such a selection was received, the routine 1600 branches to block 1628, where a new contact is generated for use by the PIM client application 28 for the selected member. If no such input was received at block 1626, the routine 1600 continues to block 1634.

At block 1634, a determination is made as to whether a request to edit the membership of the currently selected collaboration project site through a selection of one of the menu items 100H, 100I, or 100J. As discussed above, through a selection of these menu items the selected member may be removed from the site or information for the selected member may be edited. If such a selection is received at block 1634, the routine 1600 branches to block 1636 where the requested editing function is performed by transmitting a SOAP request to the collaboration server computer 4 or by opening a web page maintained by the collaboration server computer 4 for performing the requested function. If, at block 1634, a request was not received to edit the membership of the currently selected collaboration project site, the routine 1600 continues from block 1634 to block 1638.

At block 1638, a determination is made as to whether the menu item 100L was selected for viewing properties associated with the selected member. If such a selection was made, the routine 1600 branches to block 1640 where the properties for the selected user are retrieved from the PIM client application 28 and displayed. If no such selection was made block 1638, the routine 1600 continues to block 1642 from block 1638.

At block 1642, a determination is made as to whether the selection received by the user was outside of the context menu 98. If the selection was outside the context menu 98, the context menu will be removed. Accordingly, if the selection was outside the context menu 98, the routine 1600 branches from block 1642 to block 1630 where the context menu is removed. If the selection was not outside the context menu, the routine 1600 branches from block 1642 to block 1608 where additional user input is received. From blocks 1612, 1616, 1620, 1624, 1628, 1636, and 1640, the routine 1600 continues to block 1630 where the context menu is removed from the display screen. The routine 1600 then continues from block 1630 to block 1632 where it returns to block 1508, described above with respect to FIG. 15.

Figure 17:
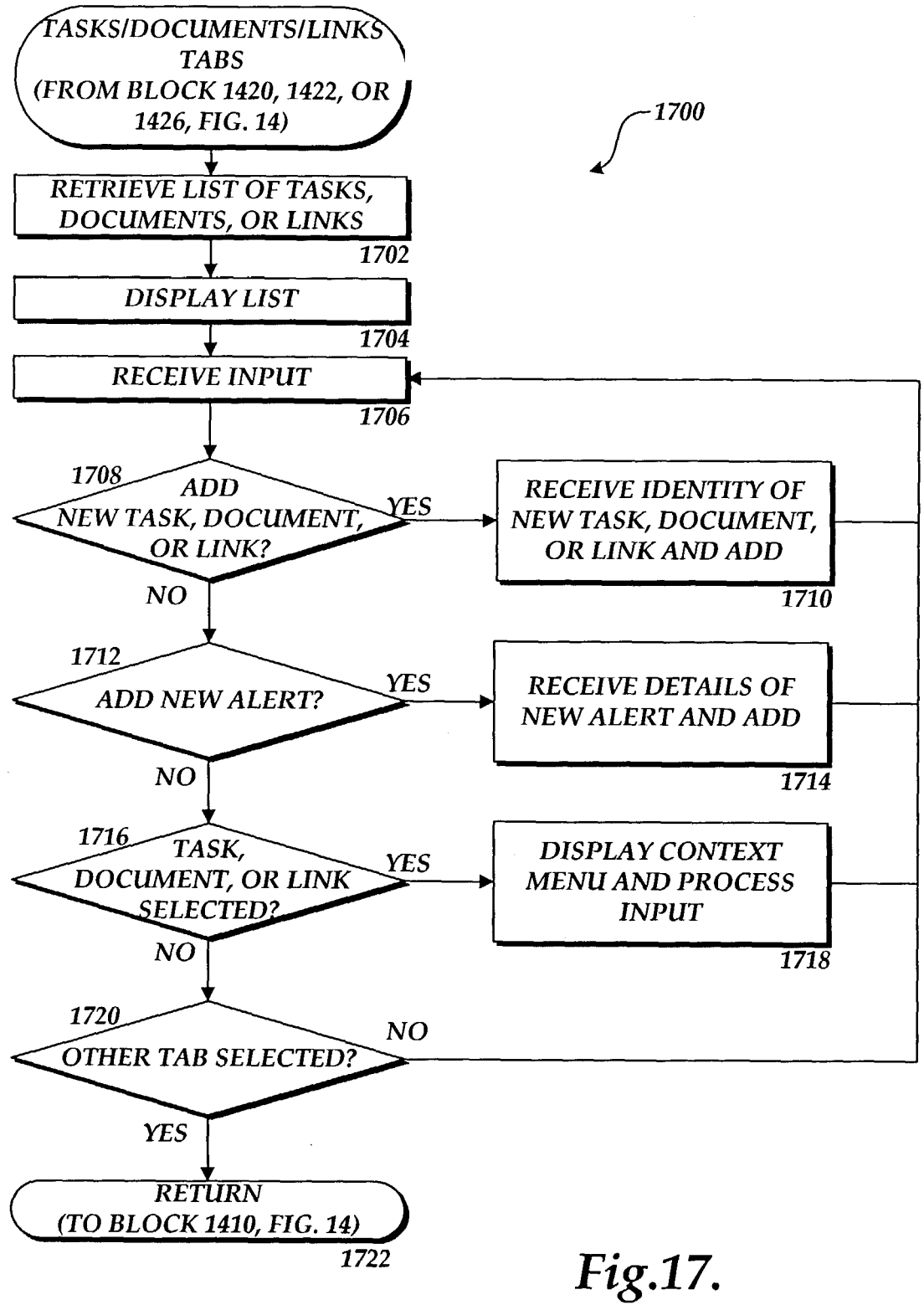

Referring now to FIG. 17, an illustrative routine 1700 will be described illustrating the processing of the selection of the tabs 72B, 72C and 72D. As described above, the tabs 72B, 72C, and 72D cause the contents of the collaboration pane 68 to display information relating to the current task, documents, and links for the currently selected collaboration project site. As shown in FIG. 17, the processing of each of these tabs is handled in a substantially manner.

The routine 1700 begins at block 1702, where, depending on the particular tab selected, the list of task, documents, or links is retrieved from the collaboration server computer 4 for the currently selected collaboration project site. The routine 1700 then continues to block 1704, where the appropriate list is displayed within the collaboration pane 68. As described above, the list may be periodically updated or manually updated by a user. From 1704, the routine 1700 continues to block 1706, where user input is received.

From block 1706, the routine 1700 continues to block 1708, where a determination is made as to whether the received input comprises a request to add a new task, document, or link to the displayed list. If such a request was received, the routine 1700 branches from block 1708 to 1710, where the identity of the new task document or link to be added is received from the user. A command is then transmitted to the collaboration server computer 4 to initiate the addition of the newly identified task, document, or link. From block 1710, the routine 1700 returns to block 1706 where additional input may be received.

If, at block 1708 it is determined that a request was not made to add a new task, document, or link, the routine 1700 continues to block 17012. At block 1712, a determination is made as to whether the user has requested to add a new alert for a entry in the task, document or link list. If such a request has been received, the routine 1700 branches to block 1714 where the parameters regarding the new alert are received from the user. For instance, a user may indicate that they would like to be notified when the selected item is modified. Once the parameters have been received, a command is transmitted to the collaboration server computer 4 to add the new alert. From block 1714, the routine 1700 returns to block 1706 where additional input is received.

If, at block 1712, it is determined that a request to add a new alert was not received, the routine 1700 continues to block 1716. At block 1716, a determination is made as to whether an item in the task list, the documents list 106, or links list 114 ahs been selected. If such a selection has been made, the appropriate context menu is displayed in conjunction with the selected item and input directed toward the context menu is processed. From block 1718, the routine 1700 returns to block 1706, where additional input is received.

If, at block 1716 it is determined that an item has not been selected, the routine 1700 continues to block 1720. At block 1720, a determination is made as to whether one of the other tabs 72A-72F has been selected, other than the currently selected tab. If another tab has not been selected, the routine 1700 returns back to block 1706, where additional input is received. If another tab has been selected, the routine 1700 continues to block 1722, where it returns to block 1410, described above with respect to FIG. 14.

Based on the foregoing, it should be appreciated that the various embodiments of the invention include a method, system, apparatus, and computer-readable medium for viewing and managing collaboration data from within the context of a shared document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for viewing and managing collaboration data from within the context of a shared electronic document, the method comprising:

displaying a document editing pane for editing the shared document; and displaying a collaboration pane adjacent to the document editing pane, the collaboration pane including a section displaying a plurality of icons, each icon for selecting a view associated with one from a set of: an alert list, a collaborator list, a task list, a document list, a web browser, and a help menu, and the collaboration pane operative to display the collaboration data, wherein the collaboration data comprises, when an icon associated with the task list is selected, at least one task list identifying: at least one task to be performed; a subject matter of the at least one task; a priority of the at least one task; and a due date for completion of the task, when an icon associated with the document list is selected, at least one document list identifying: at least one document to be edited; a creating collaborator of the at least one document; a last modifying collaborator of the at least one document; and a last modification date of the at least one document, and when an icon associated with the web browser is selected, at least one link list identifying at least one link associated with the collaboration data.

2. The method of claim 1, wherein the collaboration data comprises the identities of at least one of the collaborators, and wherein the collaboration pane comprises a user interface element which, when selected, causes the identities of the at least one of the collaborators to be displayed.

3. The method of claim 2, wherein a network status is displayed in the collaboration pane for each of the at least one of the collaborators.

4. The method of claim 3, further comprising:

receiving the selection of the displayed identity for at least one of the collaborators;

in response to receiving the selection, displaying at least one of the actions that may be performed with respect to the selected identity;

receiving a selection of at least one of the actions; and performing the selected action.

5. The method of claim 4, wherein at least one of the actions comprises scheduling an appointment on a calendar related to the selected identity.

6. The method of claim 4, wherein at least one of the actions comprises placing a telephone call to a number associated with the selected identity.

7. The method of claim 4, wherein at least one of the actions comprises sending an electronic mail message to an address associated with the selected entity.

8. The method of claim 4, wherein at least one of the actions comprises initiating an instant messaging session with the selected identity.

9. The method of claim 4, wherein at least one of the actions comprises editing information associated with the selected identity.

10. The method of claim 4, wherein at least one of the actions comprises removing authorization to access a collaboration group related to the collaboration data for the selected identity.

11. The method of claim 4, wherein at least one of the actions comprises adding the selected identity to a contacts list.

12. The method of claim 4, wherein at least one of the actions comprises viewing properties associated with the selected identity.

13. A method for viewing and managing collaboration data from within the context of a shared electronic document, the method comprising:

providing a first user interface pane for editing the shared electronic document;

providing a second user interface pane adjacent to the first user interface for viewing and managing the collaboration data operative to display the collaboration data, wherein the collaboration data comprises, when an icon associated with the task list is selected, at least one task list identifying: at least one task to be performed; a subject matter of the at least one task; a priority of the at least one task; and a due date for completion of the task, when an icon associated with the document list is selected, at least one document list identifying: at least one document to be edited; a creating collaborator of the at least one document; a last modifying collaborator of the at least one document; and a last modification date of the at least one document, and when an icon associated with the web browser is selected, at least one link list identifying at least one link associated with the collaboration data, the second user interface pane comprising a first user interface object which, when selected, causes an identity for each of the at least one of the collaborators on the shared electronic document to be displayed in the second user interface pane, a second user interface object which, when selected, causes at least one of the tasks to be displayed in the second user interface pane.

14. The method of claim 13, wherein the collaboration data comprises the identities of at least one of the documents, and wherein the second user interface pane further comprises a third user interface object which, when selected, will cause the identities of at least one of the documents to be displayed in the second user interface pane.

15. The method of claim 14, wherein the collaboration data comprises at least one of the links, and wherein the second user interface pane further comprises a fourth user interface object which, when selected, will cause at least one of the links to be displayed in the second user interface pane.

16. The method of claim 15, wherein the collaboration data comprises document information associated with the shared electronic document, and wherein the second user interface pane further comprises a fifth user interface object which, when selected, causes the document information to be displayed in the second user interface pane.

17. The method of claim 16, further comprising periodically updating the collaboration data.

* * * * *